United States Patent
Gerakopulos et al.

(10) Patent No.: US 11,203,132 B2
(45) Date of Patent: Dec. 21, 2021

(54) METHOD AND SYSTEM FOR FORMING COMPOSITES

(71) Applicants: Ryan Joaquin Gerakopulos, Waterloo (CA); Chitral Jayasanka Angammana, Guelph (CA); Sheshakamal Jayaram, Waterloo (CA)

(72) Inventors: Ryan Joaquin Gerakopulos, Waterloo (CA); Chitral Jayasanka Angammana, Guelph (CA); Sheshakamal Jayaram, Waterloo (CA)

(73) Assignee: Trusscore Inc., Palmerston (CA)

( * ) Notice: Subject to any disclaimer, the term of this patent is extended or adjusted under 35 U.S.C. 154(b) by 917 days.

(21) Appl. No.: 15/037,957

(22) PCT Filed: Nov. 20, 2014

(86) PCT No.: PCT/CA2014/051110
§ 371 (c)(1),
(2) Date: May 19, 2016

(87) PCT Pub. No.: WO2015/074151
PCT Pub. Date: May 28, 2015

(65) Prior Publication Data
US 2016/0297100 A1    Oct. 13, 2016

Related U.S. Application Data

(60) Provisional application No. 61/962,964, filed on Nov. 20, 2013.

(51) Int. Cl.
*B29B 7/12*  (2006.01)
*B29C 70/32* (2006.01)
(Continued)

(52) U.S. Cl.
CPC .............. *B29B 7/12* (2013.01); *B29C 41/006* (2013.01); *B29C 41/085* (2013.01); *B29C 70/32* (2013.01);
(Continued)

(58) Field of Classification Search
CPC ......... B29B 7/12; B29C 70/32; B29C 41/006; B29C 41/085; B29C 41/10; D01D 5/18;
(Continued)

(56) References Cited

U.S. PATENT DOCUMENTS 8,277,711 B2    10/2012    Huang et al.
2002/0084178 A1 *  7/2002    Dubson ................ D01D 5/0092
                                                                    204/157.6
(Continued)

FOREIGN PATENT DOCUMENTS

WO    WO03/080905 A1 *  10/2003
WO    WO2012171040 A1 *  12/2012    ............. A61L 31/06

*Primary Examiner* — Michael M. Robinson
(74) *Attorney, Agent, or Firm* — Woods Oviatt Gilman LLP; Dennis B. Danella, Esq.

(57) ABSTRACT

There is provided a method and system for forming a composite material. The method includes: combining a first component element with a second component element to form a composite mixture; subjecting the composite mixture to a first force to in order to form ligaments and disperse the first component element and second component element in relation to each other, wherein the first force is a mechanical force, subjecting the ligaments to at least one second force in order to form attenuated ligaments and further disperse the first component element and second component element in relation to each other, wherein the at least one second force imparts both shear flow deformation and extensional flow deformation to the ligaments to form the attenuated (Continued)

ligaments; and collecting the attenuated ligaments. There is also provided a composite material prepared using the method described above.

9 Claims, 17 Drawing Sheets

(51) Int. Cl.

| | | |
|---|---|---|
| *D01D 5/18* | (2006.01) | |
| *D01D 5/00* | (2006.01) | |
| *B29C 41/00* | (2006.01) | |
| *B29C 41/08* | (2006.01) | |
| *B29K 83/00* | (2006.01) | |
| *B29K 105/16* | (2006.01) | |

(52) U.S. Cl.
CPC ............. *D01D 5/0069* (2013.01); *D01D 5/18* (2013.01); *B29K 2083/00* (2013.01); *B29K 2105/162* (2013.01); *B29K 2995/0092* (2013.01); *B29K 2995/0093* (2013.01)

(58) Field of Classification Search
CPC ...... D01D 5/0069; D01D 5/003; D01D 5/098; D01D 5/0023; B05B 3/1014; D01F 1/02; C08K 3/36; B29K 2083/00
See application file for complete search history.

(56) References Cited

U.S. PATENT DOCUMENTS

| | | | |
|---|---|---|---|
| 2006/0057350 A1* | 3/2006 | Ochi | D01F 8/12 428/292.1 |
| 2008/0131707 A1* | 6/2008 | Feeney | C08K 3/346 428/451 |
| 2009/0160099 A1 | 6/2009 | Huang | |
| 2010/0129628 A1* | 5/2010 | Young | D01D 5/18 428/219 |
| 2011/0111201 A1* | 5/2011 | Reneker | D01D 5/00 428/222 |
| 2014/0094551 A1 | 4/2014 | Koslow et al. | |
| 2015/0038038 A1* | 2/2015 | Korley | D06M 15/55 442/166 |

\* cited by examiner

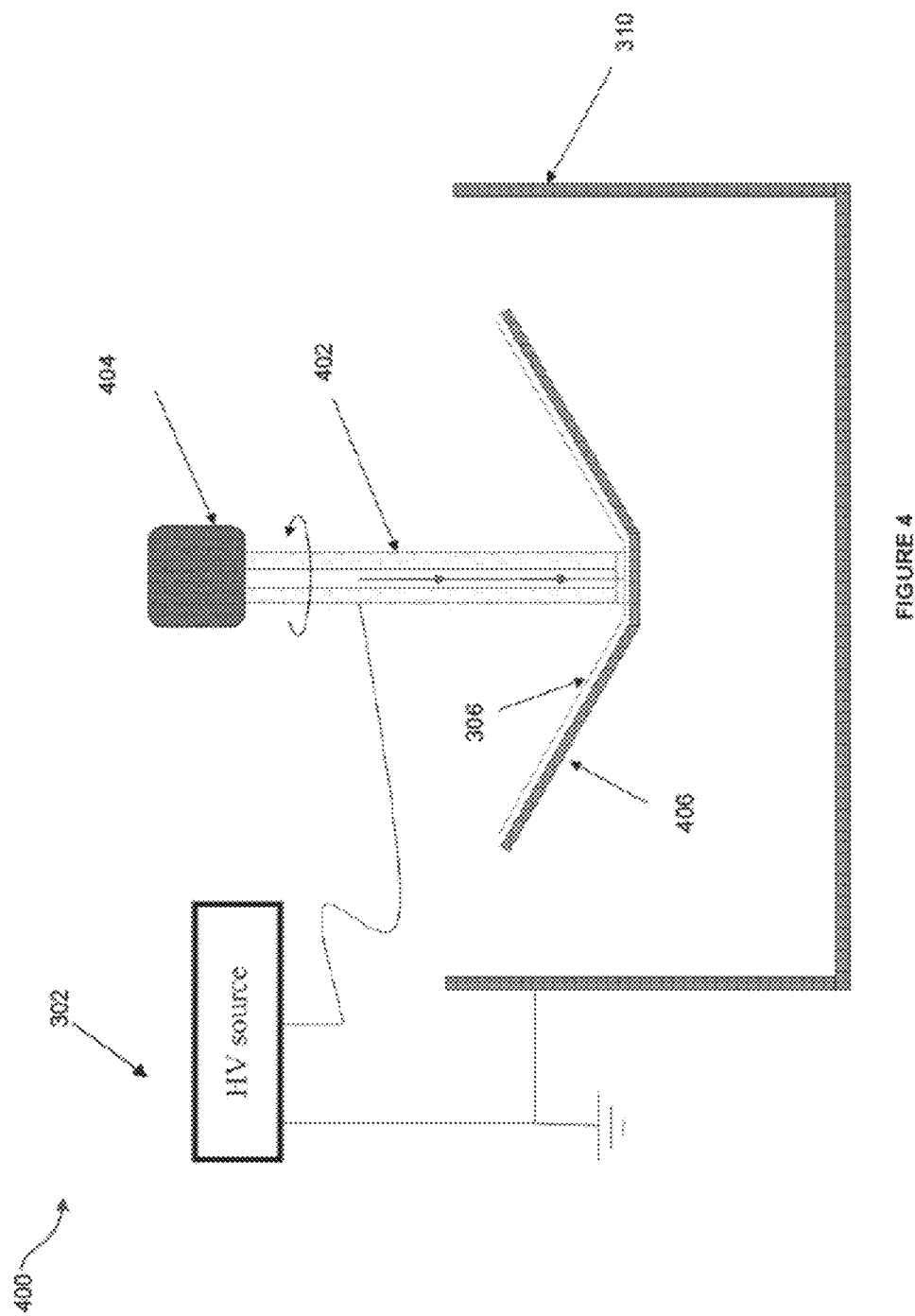

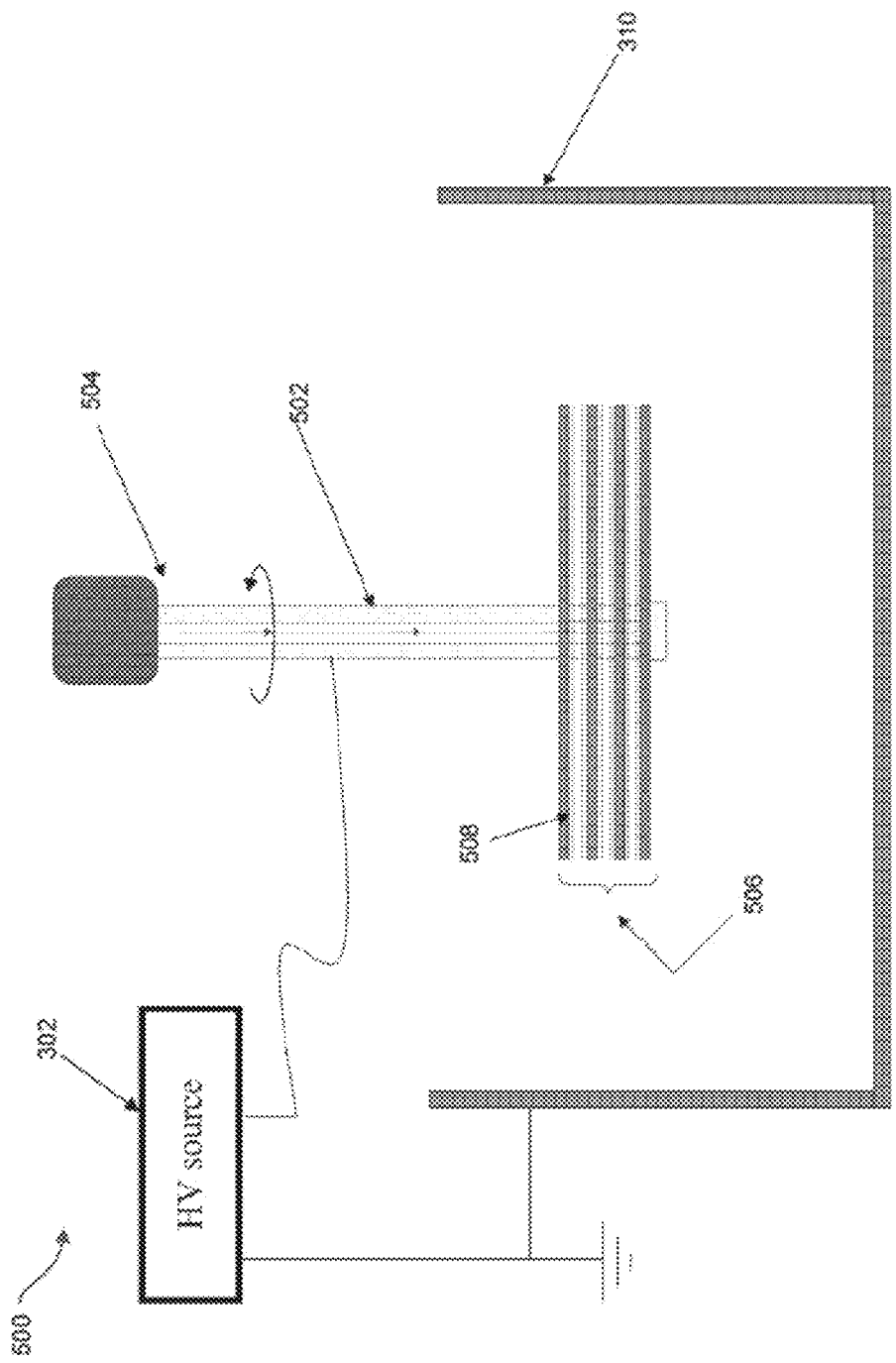

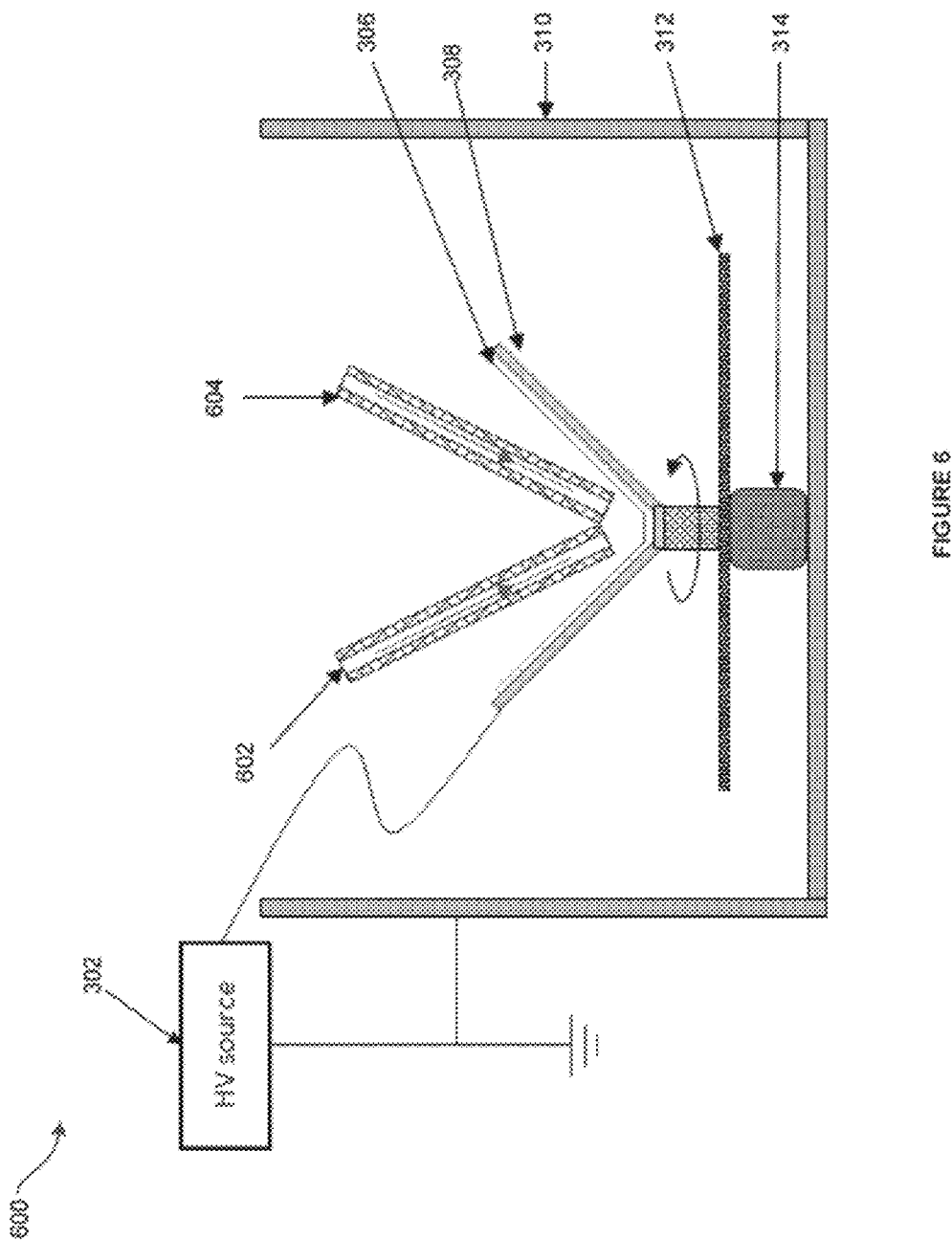

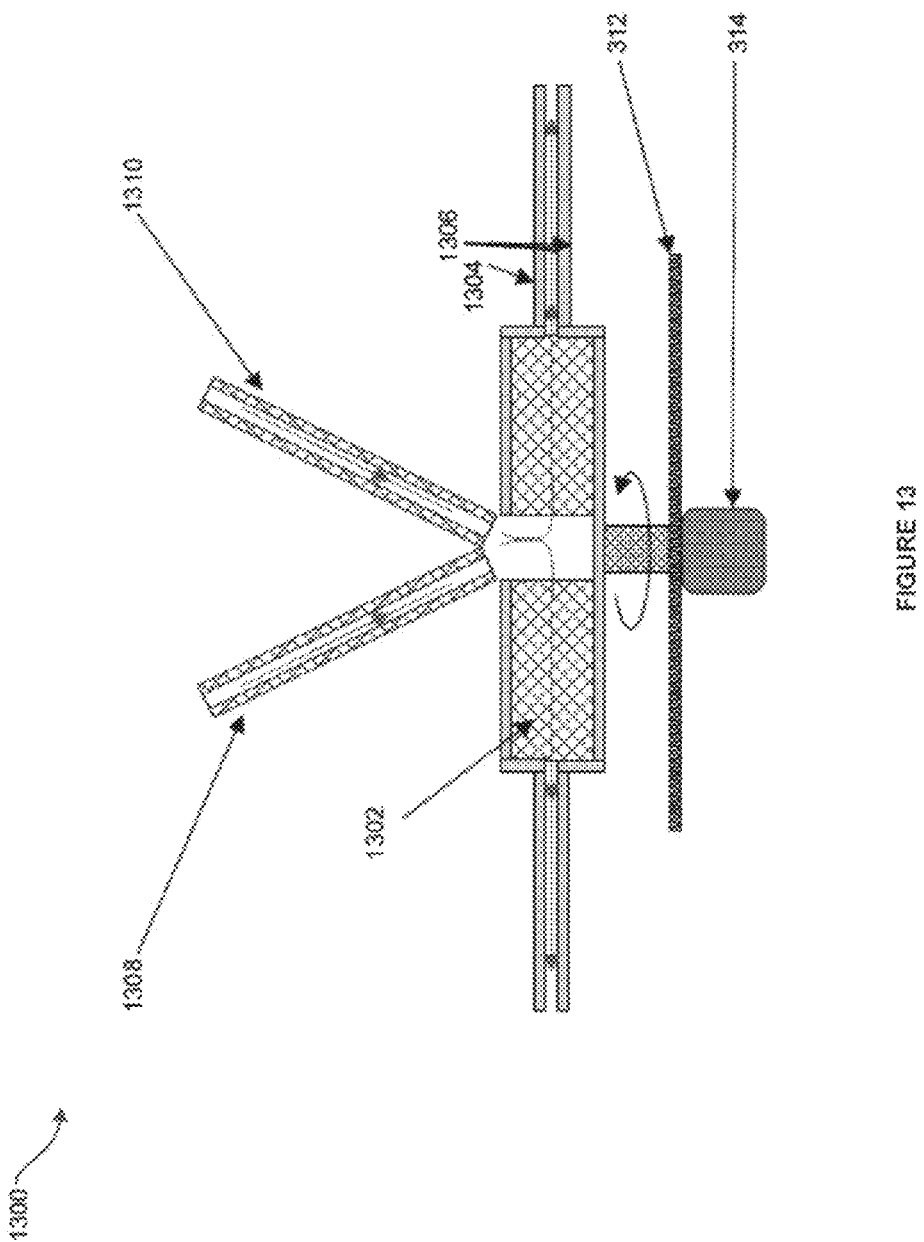

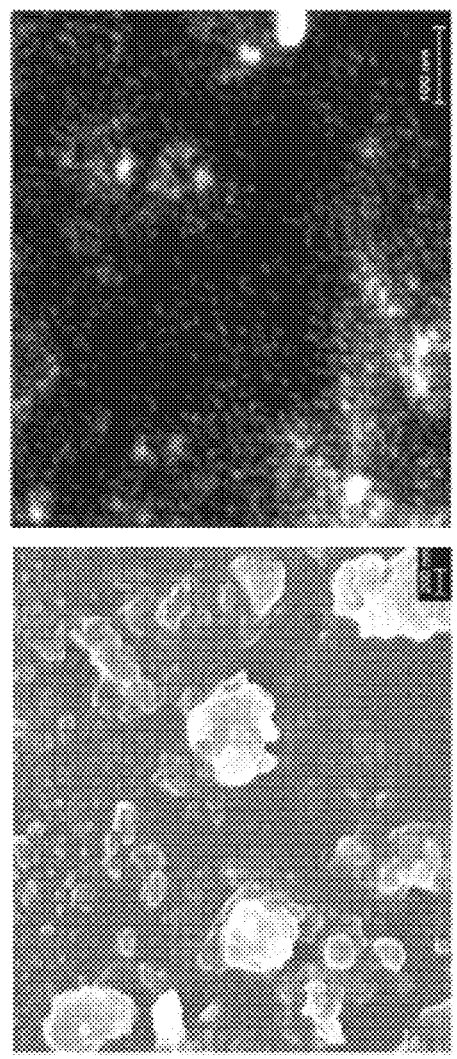

METHOD AND SYSTEM FOR FORMING COMPOSITES

CROSS REFERENCE TO RELATED APPLICATIONS

This application is a National Stage filing under 35 U.S.C. § 371 of International Application No. PCT/CA2014/051110, filed Nov. 20, 2014, which claims the benefit of U.S. Provisional Patent Application No. 61/962,964 filed Nov. 20, 2013 which is hereby incorporated herein by reference.

FIELD

The present disclosure relates generally to a method and system for forming composite materials and the composite materials formed thereby. More particularly, the present disclosure relates to a method and a system for forming composites from a viscoelastic matrix material or a composite that exhibits induced viscoelastic behaviour with fillers incorporated therein.

BACKGROUND

The production of composite materials, particularly involving plastics, emerged at the beginning of the 20th century and has continued to experience significant growth ever since. Today, there is strong pressure to make composite materials, such as plastic blends, which often have improved properties over conventional plastics and are cost effective. These demands have placed substantial pressure on the plastics industry to improve polymer processing technology and resultant materials.

In general, composite materials may be stronger, lighter weight, less expensive, and less susceptible to breakage than traditional materials. For instance, polymer based composites have shown great promise in many industries including aerospace, electrical, medical, transportation, and environmental compared to other traditional materials. Manufacturers of composite materials are tasked with determining the best balance of properties, processing characteristics, and economic considerations for a given specific application. Particularly, they must determine the proper combination of micro-sized and nano-sized fillers for the desired property of the material.

Conventional processing methods include mixing micro-sized and nano-sized fillers in polymer composites. Conventional mixing technologies, such as high shear mixers and extrusion compounders, generally rely on classical mechanical forces for dispersive mixing. However, these techniques are typically limited to micro-sized fillers as it can be difficult to breakup nano-sized agglomerations using these techniques. In order to use nano-sized fillers, surfactants are conventionally used to reduce the surface energy between fillers, which may make it easier to break nano-sized agglomerations. However, the addition of surfactants may undesirably alter the properties of the final composite materials and may not solve the problem of limitation of loading level of micro- and/or nano-fillers in the matrix material. In this document, the viscoelastic matrix material will sometimes be referred to as a matrix material.

SUMMARY

It is an object of the present disclosure to obviate or mitigate at least one disadvantage of previous systems and methods for dispersing micro- and/or nano fillers into matrix materials such as polymers.

In a first aspect, there is provided a method for forming a composite material, the method includes: combining a first component element with a second component element to form a composite mixture; subjecting the composite mixture to a first force to in order to form ligaments and disperse the first component element and second component element in relation to each other, wherein the first force is a mechanical force; subjecting the ligaments to at least one second force in order to form attenuated ligaments and further disperse the first component element and second component element in relation to each other, wherein the at least one second force imparts both shear flow deformation and extensional flow deformation to the ligaments to form the attenuated ligaments; and collecting the attenuated ligaments.

In a particular case, the at least one second force is a continuation of the first force.

In another case, the first component element is viscoelastic material and the second component element is a filler.

In yet another case, the viscoelastic material is a polymer.

In yet another case, the first force is a centrifugal force and the at least one second force are a centrifugal force and an electrostatic force.

In yet another case, the combining the first component element and the second component element includes pre-mixing the first component element and the second component element.

In yet another case, the composite mixture is a film.

In a further aspect, there is provided A system for forming a composite from at least a first component element and a second component element, the system includes: a feeder for feeding the first component element and the second component element as a composite mixture; a first disperser for dispersing the first component element and second component element in relation to each other within the composite mixture using a first force to form ligaments, wherein the first force is a mechanical force; a second disperser for dispersing the first component element and second component element in relation to each other within the ligaments using one or more second forces to form attenuated ligaments, wherein the at least one second force imparts both shear flow deformation and extensional flow deformation to the ligaments to form the attenuated ligaments; and a collector for collecting the attenuated ligament.

In a particular case, the first component element is a polymer and the second component element is a filler.

In another case, the first component element is a first polymer and the second component element is a second polymer.

In yet another case, the feeder includes a first feeder for the first component element and a second feeder for the second component element and the first component element and second component element are pre-mixed in the feeder.

In yet another case, the composite mixture is a film.

In a further embodiment, the first disperser and the second disperser include a rotating surface configured to receive the composite mixture from the feeder at approximately the center of the rotating surface; the first force comprises a centrifugal force imparted to the composite mixture in a first predetermined portion of the rotating surface; the at least one second force includes a centrifugal force imparted to the ligaments at a second predetermined portion near the edge of the rotating surface and is configured to be sufficient to eject the ligaments off of the rotating surface; and the collector is a predetermined distance from the rotating surface In a particular case, the at least one second force further is an electrical force provided between the rotating surface and the collector.

In another aspect, there is provided a composite material prepared using the method described above.

In a particular case, the resulting loading level of the first or second component element in the composite material is greater than approximately 10 wt %.

In another case, the resulting loading level of the first or second component element in the composite material is greater than approximately 50 wt %.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures:

FIG. 4 is a diagram of an embodiment of a single-feed rotary disperser with a mechanically coupled feeder;

FIG. 5 is a diagram of an embodiment of a single-feed rotary disperser with multiple rotating surfaces;

FIG. 6 is a diagram of an embodiment of a dual-feed rotary disperser;

FIG. 13 is a diagram of an embodiment of a dual-feed rotary disperser with multiple rotating surfaces and a static mixer;

FIG. 17A is a scanning electron microscopy (SEM) image showing a composite with 10% wt silica filler in liquid silicone rubber (LSR) using a conventional mixing method;

FIG. 17B is a SEM image showing a composite with 10% wt silica filler in LSR using a multiple force mixing method, according to an embodiment;

DETAILED DESCRIPTION

Generally, the present disclosure provides a method and a system for forming composites by mixing fillers and matrix materials (e.g., polymers) using a combination of shear and extension forces.

Typically, plastic processing can be characterized by: (1) mixing or homogenization, (2) blending of polymers, and (3) compounding. Compounding is generally the act of incorporating additives such as fillers into a polymer matrix. Mixing, blending, and compounding can be complex processes involving specialized machinery and know-how to produce materials with desired properties.

Machinery for polymer processing typically employs a combination of two forms of mixing to make polymer composites: (1) distributive mixing and (2) dispersive mixing. Distributive mixing is typically the act of homogeneously distributing properties of a polymer compound, such as one with uniform temperature. Dispersive mixing can be more complex as it typically involves the application of stresses, often shear stress. The stress is applied to break up the domains of the dispersed phase, such as fillers, to be embedded in the polymer matrix. Irrespective of filler type, it may be difficult to dispersively mix and break up micro and/or nano fillers since they tend to agglomerate due to their surface energy arising from Van der Waals forces.

Figure 1:
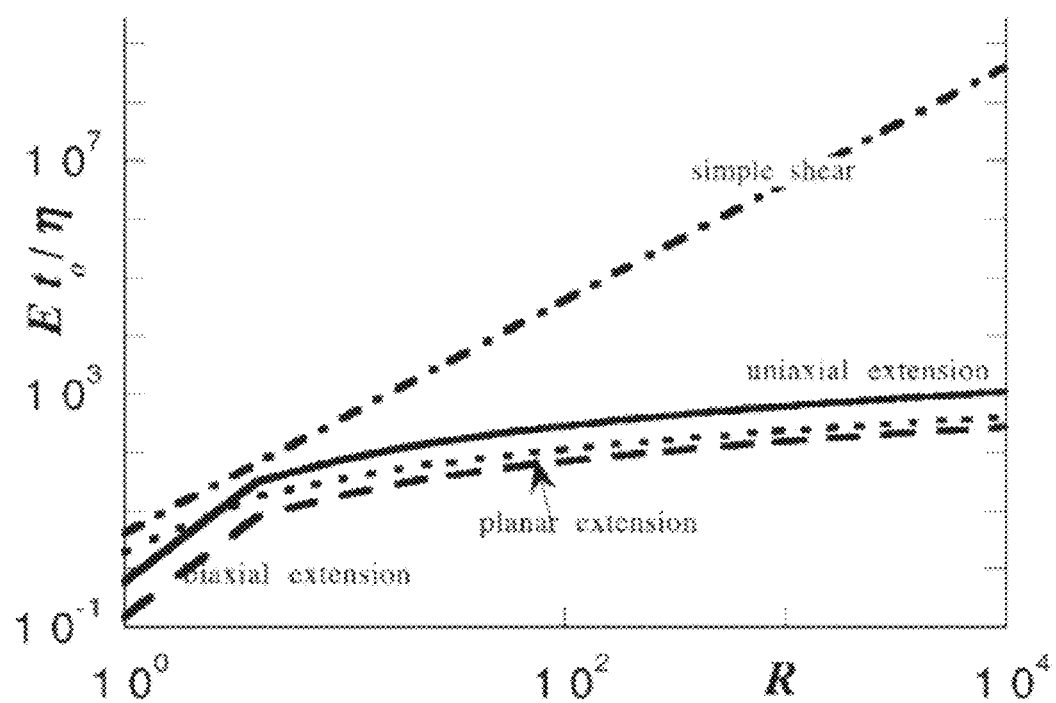
FIG. 1 is a graph illustrating mixing energy versus interfacial growth for shear and extensional flows.

Consequently, filler agglomerations restrict loading levels (that is, the amount of filler that can be added) and adversely affect the processability of a compound due to the increase in viscosity. The input mixing energy intensity may be dependent on the mode of deformation, which generally arises from either shear or extensional flow deformations. Efficient deformation of a compound generates a polymer filler interfacial surface so that the input mixing energy can infiltrate, for example locally-attack, and overcome the surface energy barrier of agglomerated filler structures. The relationship between required input energy, for example mixing energy, and the surface generation, for example interfacial growth, was examined by Utracki (L. A. Utracki, "Polymer blends handbook," Vol. 1, 2002, p. 577-585). The results of the Utracki examination are shown in FIG. 1. FIG. 1 illustrates a graph of the mixing energy (vertical axis) plotted against interfacial growth (horizontal axis) for shear and extensional flows. The examination appears to suggest that extensional flows are more effective for dispersive mixing than shear flows for three reasons: (1) greater interfacial surface area, (2) less input mixing energy required, and (3) extensional flow fields exhibit a higher rate of spatial separation between two material points in comparison to shear flow fields. It has also been shown that extensional flow deformation may be more effective than shear flow deformation for breaking up the dispersed-phase domains in a polymer matrix.

Some polymer processing technologies for compounding micro and/or nano composites may include direct use of high shear mixers, roll mixers, Banbury mixers, and extruders such as counter-rotating twin-screw extruders. These approaches typically use mechanical forces for distributive and dispersive mixing and are typically designed to exploit deformation based on shear flows rather than extensional flows.

Certain processing technologies for production of advanced composites with nanoscale fillers may leverage extensional flows. For instance, extruder screw and high shear mixing blade designs have been modified to generate extensional flow fields. However, in these devices, extensional flow deformation is generally applied to a bulk-material due to restrictions of the mature technology architectures. When extensional flow deformation is applied to bulk-material, polymer film generation is limited by the imposed stress; thus, the imposed input energy is often ineffective in breaching the energy barrier to breakup agglomerated filler structures.

Contrary to classical mechanical methods, other techniques, such as dual asymmetric centrifugal (DAC) mixers, may also be used for dispersing fillers in liquids and compounds. However, DACs typically may suffer from poor scalability and are generally only capable of achieving filler loading levels similar to that of classical mechanical methods.

High pressure homogenization and sonication may be effective for filler dispersion; however, these methods are only suitable for dispersion of fillers in low viscosity liquids, such as solvents, rather than polymers.

Chemical treatments such as surfactants, dispersant aids, and filler surface treatments may also be used, often in conjunction with conventional mechanical methods. Chemical treatments may reduce the surface energy between fillers, and the interfacial tension between fillers and the polymer. This reduction may make it easier to break up agglomerations during mixing. However, these chemical treatments may be expensive. As well, these chemical treatments may alter the final composite properties and can also manifest as contaminants and volatile organic compounds (VOCs) which are harmful to humans and the environment. Further, using these chemical treatments, the loading level of nanostructured fillers in the final composite may still be limited. Consequently, conventional approaches for exploiting extensional flow deformation for dispersive mixing have a number of limitations. Thus, there is a strong market demand for improved polymer composites than what can be provided with conventional processing approaches.

When dispersing nano and/or micro fillers in a polymer matrix, a difficulty may arise when attempting to achieve a better dispersion of fillers in the matrix. Very small size fillers, generally in the range of micro and/or nano scales, normally tend to agglomerate due to their surface energy arising from Van der Waals forces. Thus, agglomerations are typically difficult to breakup. Breaking these agglomerations may be even more difficult in a polymer matrix due to the higher viscosity of polymers compared to the lower viscosity liquids. Thus, better dispersion and a lower degree of agglomerated fillers, namely agglomeration occurrence, size, and distribution, may be needed to achieve a desired set of properties for the final composite material.

Certain mixing technologies, such as high shear mixers and extrusion compounders, rely on classical mechanical forces for dispersive mixing, for example shear flow deformation, to break up agglomerated fillers. However, these techniques are typically limited to micro-sized fillers as it becomes increasingly difficult to breakup nano agglomerations. In certain cases, surfactants may be used to reduce agglomeration of nano-fillers. Surfactants reduce the surface energy between particles, which may make it easier to break agglomerations. However, the addition of surfactants alters the properties of the final composite material and the loading levels of nanofillers in the final composite will generally still be limited.

Typically, a combination of micro and nano fillers may result in a desired compromise between material property enhancement and cost. Nano fillers are typically more expensive than their micro filler counterparts. Nano fillers are generally dispersed first in the polymer matrix and then micro fillers are dispersed. However, this sequence of adding nano fillers to the polymer first increases the mixture viscosity, thereby possibly adversely affecting how well micro fillers are subsequently dispersed. As a consequence, the final composite properties imparted by the fillers may be restricted. Due to the challenges faced with rising compound viscosity with nano fillers, nano filler loading levels are conventionally low and the mixing process is energy intensive.

Polymer composite compounding may be used to implement and utilize the principles of extensional flow deformation. Conventionally, extensional flow deformation may be used for making nonwoven fiber materials. Conventional uses of extensional flow deformation for this purpose generally do not involve the mixing of materials, but rather the formation of small fibers. However, extensional flow deformation of a fiber-shaped polymer, namely liquid jets, was determined to be applicable for the dispersion of fillers in matrix materials, and thereby applicable for the formation of composites.

Specifically, as described herein, embodiments of a system and method for forming a composite material are provided. Fillers are added to a polymer matrix, and then the composite mixture is deposited as a film on a rotating surface. The film flow is then ejected or spun from the rotating surface in the form of finger-like ligaments such that the mixture undergoes shear and extensional flow deformation. The ligaments may also be subjected to an applied electric field (or other forces) situated between the rotating surface and a collecting surface, further contributing to shear and extensional flow deformation and filler dispersion. The process is intended to be highly intensive as the composite can be broken-down into hundreds of nanometre scale ligaments where fillers are dispersed within each ligament. Hence, dispersion may be performed simultaneously on all ligaments, nearly at the microscopic level, rather than at a bulk level like that of an extrusion process. This process is intended to result in better dispersion of micro and/or nano fillers at higher loading levels and higher production rates than conventional processes.

Multiple aspects of the formation process are intended to assist with dispersal of the fillers, including, material feeding, rotating surface, ligament formation process and ligaments themself. At various times in the formation process, the agglomerated fillers may be acted upon by various forces, for example, mechanical, electrical, electrophoretic, dielectrophoretic, magnetic, and the like. For instance, forces may be applied: at a pre-mixing stage; during film flow on a rotating surface that includes distributive and dispersive mixing via shear flow deformation due to centrifugal force; during ligament formation that includes shear flow deformation due to centrifugal force; during ligament thinning at the edge of the rotating surface that includes shear and extensional flow deformation due to centrifugal, aerodynamic, electrostatic, electrophoretic, and/or dielectrophoretic force; and while subject to a region where the ligaments undergo bending instability that includes direct filler dispersion and distribution via Coulomb force. It is intended that these various forces and times of application of forces result in greater filler distribution and dispersion compared to conventional methods.

During the entirety, or majority, of the formation process, ligaments are intended to remain in a liquid-phase or amorphous-phase, which is typically contrary to conventional techniques. This phase may permit filler dispersion in ligaments under the application of an electrostatic field and mechanical forces.

In some conventional approaches, the objective is generally to produce a nonwoven matrix of dry fibers. In this process, a volatile component is usually required to evaporate from the mixture, making a phase change from liquid to solid, so that polymer ligaments solidify before depositing on the collection surface.

In contrast, in the embodiments described herein, since ligaments can remain in liquid phase, the ligaments may be deposited on the collection surface and coalesce back into a bulk heterogeneous and well-dispersed composite. The simultaneous production of a plurality of ligaments may be generally greater from a rotating surface than from conventional devices. Thus, it is intended that dispersed composite production rates are higher with the use of embodiments such as those described herein. In addition, a change in the rotating surface speed can modulate the ligament geometry, and ultimately affect filler dispersion in the polymer. A variation in the rotational speed of the rotating surface provides a means to tune filler dispersion since the ligament geometry is modulated by the rotational speed, a parameter that cannot otherwise be controlled using conventional devices.

Figure 2:
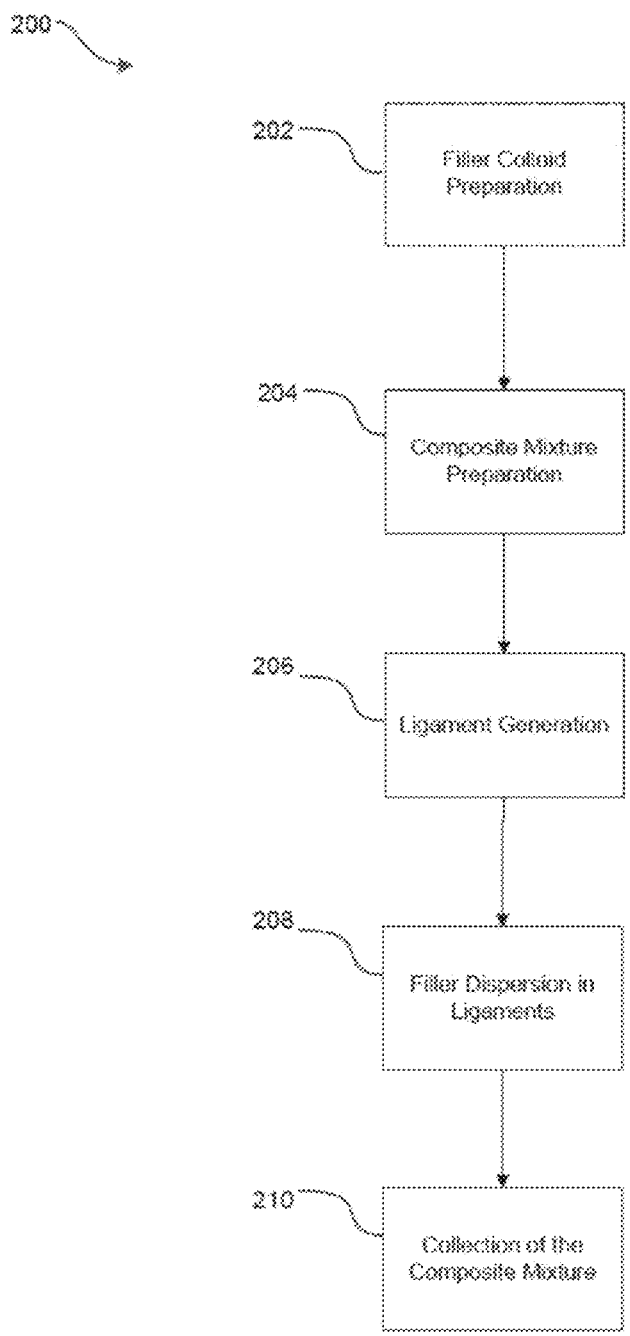
FIG. 2 is a flowchart of an embodiment of a method for dispersing fillers in a matrix material using multiple force mechanisms.

Turning to FIG. 2, a flowchart for a method 200 for forming a composite by dispersing fillers in a polymer matrix using multiple force mechanisms is shown. In some cases, at 202, an operator or machine may prepare a liquid-filler colloid or filler suspension. The preparation may include combining fillers with a compliant liquid. In general, compliant liquids will include miscible/immiscible liquids with polymer solution, liquid polymer, or polymer melt and the like. Also, solvents may be compliant liquids. In certain cases, the solvent will be a low-viscosity solvent. Fillers may be externally incorporated, with for example solid fillers, or induced during mixing, with for example liquid emulsion particles. Fillers may be generally characterized by five criteria: (1) size, (2) shape/dimension, (3) material, (4) surface chemistry, and (5) physical state.

Fillers may include both micro-sized and nano-sized objects that exist in defined singular form and have at least one dimension in either approximately the nano scale range or the micro scale range. These objects may include particles that have three dimensions in the nano and/or micro scale ranges, fibres or tubes that have two dimensions in the nano and/or micro scale ranges, and plates or flakes that have one dimension in the nano and/or micro scale ranges. In some cases, mixtures may contain only nano-sized fillers, only micro-sized fillers, or nano-sized and micro-sized fillers. The physical state of the filler may be solid, liquid, or gaseous. During the preparation of the filler colloid at 202, efficient filler dispersion techniques, such as ultrasound sonication or high-shear mixing, may be used to disperse fillers in a low viscosity compliant liquid. Fillers may be mixed into a low viscosity compliant liquid in order to generally facilitate easier dispersion. In this way, dispersion of the fillers can be undertaken prior to the fillers being introduced into the polymer; as there may be difficulty if one were to directly disperse fillers in a higher viscosity material such as a polymer. In further cases, where high viscosity liquids are used, a high shear mixer may be employed to disperse the fillers.

At 204, a mixer pre-mixes the prepared filler colloid with at least one polymer, for example, a polymer solution, liquid polymer, or polymer melt, to form composite mixture (herein generally referred to as a composite mixture). The composite mixture may be mixed using a conventional mixing technique, for example using shear flow deformation. In some cases, such as higher viscosity polymers high shear mixing may be used. The mixing of the filler colloids, or composite mixture, may be undertaken at room temperature or at an elevated temperature, for example, below the degradation temperature of the matrix material in the composite mixture. Elevated temperatures can be supplied by quiescent air sources, convecting air sources, or any other heating methods known in the art. It is intended that increasing the temperatures may decrease the viscosity of polymer ligaments; or in the case of polymer melts, keep the polymer in a melted state. In other cases, the mixing can be undertaken at sub-ambient temperatures. Sub-ambient temperatures may allow predetermined regulation of the viscosity or amorphousness of the composite mixture. Polymers, for example some rubbers, may be amorphous below ambient temperature and cure a relatively moderate ambient temperatures.

In some cases, preparation of the liquid-filler colloid at 202 may be omitted and the method 200 may begin with preparation of the composite mixture at 204. For instance, a composite mixture can be prepared by directly mixing fillers with polymer.

Surfactants can be added to improve constituent dispersion. Surfactants may be added during preparation of the liquid-filler colloids at 202 or during preparation of the composite mixture at 204. A suitable surfactant may be used, for example, Triton™ X 100, Tween™ 80, Tween™ 20, Span™ 80, ionic surfactants, non-ionic surfactants, or the like.

At 206, a system for forming a composite material such as a ligament generation device, of the type illustrated by the rotary disperser described herein, generates ligaments. In this example and other herein, the ligaments are generally liquid or amorphous. A ligament is generally a thin stream/section of the composite mixture. Although the focus of the description herein is on a rotary disperser, there may be several techniques for generating ligaments. For example, other techniques, systems or devices may employ various mechanical forces to generate ligaments, for example centrifugal force, pressure, or the like. In an example, pressure may be applied to a polymer/filler mixture in a chamber, thereby squeezing the polymer through a die plate containing an array of one or more holes. Upon passing through the die plate, the polymer composite emerges as one or more ligaments. As well, upon exiting the die plate, air jets may be actuated parallel to the ligaments, in the direction of ligament propagation, in order to further propel the ligaments through the air. In these cases, the ligaments may be generally liquid. For reference, devices that employ pressure and aerodynamic forces for generating ligaments may be generally referred to as melt blowing or melt spraying devices.

Other techniques, systems and devices may also employ atomization techniques to generate the ligaments. A polymer-filler composite ejected from the atomization nozzle or rotating surface may inherently form ligaments rather than droplets due to the viscoelastic behaviour of the polymer.

In further cases, ligaments can also be formed by employing electrical forces. In yet further cases, there may be other devices that may be employed which combine electrical, mechanical and/or other forces in order to generate ligaments. A commonality of the above described devices and associated force mechanisms are that the ligaments are strongly subjected to shear and extensional flow deformation mechanisms. In general, embodiments of a system and method for forming a composite material are intended to involve ligaments being subject to a mechanical force, ejected from a source location, and are subject to a further force or forces such that the ligaments propagate in a way that the ligaments are further attenuated until the attenuated ligaments are deposited at a collection site.

At 208, multiple force mechanisms, as described herein, provide filler dispersion in the ligaments. While in the disperser, the fillers may be strongly dispersed in the ligaments by subjecting the ligaments to multiple force mechanisms during the ligaments' movement/flight path. The dispersion in the ligaments may be through one or more of the force mechanisms described below.

Force may be applied to the ligaments by an electric field. The electric field may be generated across the ligaments' flight path from the source to collection location by, for example, applying a high voltage at the ligament generation location, namely the disperser, and grounding the collection location, namely a collection surface. The centrifugal, pressure, and/or aerodynamic forces described above may impose shear and extensional flow deformation, thereby thinning the ligaments. The electric field may then induce further ligament thinning by extensional and shear flow deformation via electrostatic, electrophoretic, and/or dielectrophoretic forces on the ligaments.

The ligaments may then be subjected to further extensional and shear flow deformation via a bending instability. The bending instability is intended to be due to the Coulomb forces of electrically charging the ligaments and/or mechanical forces arising from aerodynamic instability of the ligaments, resulting in very thin ligaments with sub-micronic dimensions. During the flight path, the dispersion can be very significant due to strong extensional and shear flow deformation acting on a vigorously whipping ligament. Due in part to the ligaments possibly being on the order of nanometres in cross-section, the velocity of the ligaments in this region can be several times the speed of sound. In addition, since the ligaments diametral dimensions may be on the nanoscale, charging of fillers with the same polarity within the ligament can result in strong repulsion of the charged fillers, which may further enhance the dispersion. In some cases, the medium in which the ligaments are immersed during the flight path can be at a predetermined temperature; for example, at ambient temperature, at elevated temperatures, or at sub-ambient temperatures. Elevated temperatures can be supplied by quiescent air sources, convecting air sources, or any other heating methods known in the art. It is intended that increasing the temperatures may decrease the viscosity of polymer ligaments; or in the case of polymer melts, keep the polymer in a melted state. Sub-ambient temperatures may allow predetermined regulation of the viscosity or amorphousness of the composite mixture. Polymers, for example some rubbers, may be amorphous below ambient temperature and cure a relatively moderate ambient temperatures.

At 210, the ligaments are deposited on a collection surface. During filler dispersion in the ligaments, compliant liquid may or may not evaporate while the remaining composite mixture constituents will be deposited on the collection surface. It is intended that the ligaments remain in liquid or an amorphous phase during the entirety, or majority, of the process. As a consequence, when the ligaments deposit on the collection surface, the ligaments can coalesce to form or reform a well-dispersed heterogeneous bulk material, film, porous material, or the like.

Figure 3:
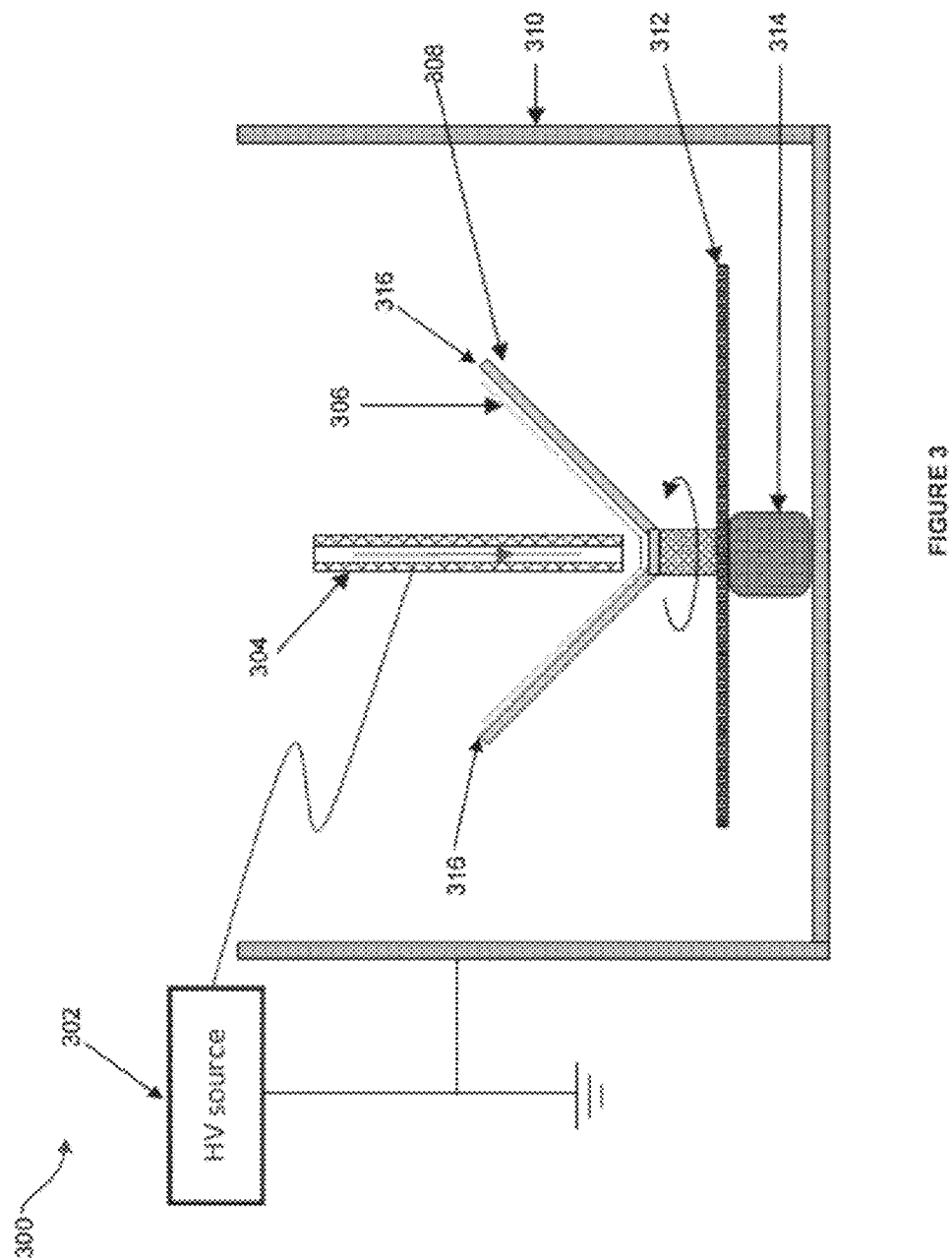
FIG. 3 is a diagram of an embodiment of a single-feed rotary disperser.

Turning to FIG. 3, a diagram of a single-feed rotary disperser 300 is shown. In this embodiment, the rotary disperser 300 includes a high-voltage source 302, a feeder 304, a rotating surface 308, a collection surface 310, an insulator plate 312, and a motor drive 314.

With the rotary disperser 300, polymer and filler composites can be formed either by pre-mixing the composite mixture, or by direct mixing of the fillers and polymers at the feeder 304 or on the rotating surface 308.

Fillers may be dispersed in a compliant liquid first, forming liquid-filler colloids, prior to integration with a polymer to form the composite mixture. In the alternative, fillers may be directly integrated with the polymer to form the composite mixture.

The composite mixture is then delivered to the feeder 304. The feeder 304 may be, for example, a tube, valved conduit, or the like. The feeder 304 deposits the composite mixture onto the rotating surface 308. The rotary disperser shown in FIG. 3 is in a decoupled configuration. In this configuration, the feeder 304 is mechanically decoupled from the rotating surface 308. As such, the feeder 304 is not forced to rotate while the rotating surface 308 is rotating. As described herein, in further embodiments, the feeder 304 may be configured to receive the polymer and the filler, and premix the colloid in the feeder 304 prior to deposition onto the rotating surface 308.

The rotating surface 308 rotates via mechanical connection to the motor drive 314. In further cases, any arrangement or mechanism to rotate the rotating surface 308 may be used. In the example of FIG. 3, the rotating surface 308 is spun by the motor drive 314 between approximately 500 to 10,000 revolutions-per-minute. In further cases, the rotating surface 308 may be spun at any speed that produces the desired forces. After being deposited on the rotating surface 308, the composite mixture forms a freely moving film, for example, a thin film or film flow 306 on the rotating surface 308. While the film 306 is on the rotating surface 308, the film 306 will undergo localized shear mixing due to the centrifugal forces, viscous forces, surface tension forces, and the like.

In the embodiment of FIG. 3, an electric field is generated between the rotating surface 308 and the collection surface 310 by applying high voltage. The high voltage is produced by connecting the feeder 304 to the high-voltage source 302 and connecting the collection surface 310 to ground. In this arrangement, the composite mixture becomes charged while traversing the feeder 304 and becomes subject to electrical forces as the mixture travels towards the collection surface 310 across the generated electric field. In further embodiments, other field forces may be used, for example, a magnetic field, differences in air pressure, or the like. In further cases, the voltage polarity may be reversed. For instance, in the rotary disperser 300 of FIG. 3, the feeder 304 and the rotating surface 308 may be grounded and the collection surface 310 may be connected to the high voltage source. As well, the voltage source 302 may be either at positive or negative potential. It will be understood that one of skill in the art may determine other arrangements to electrically charge the rotating surface or otherwise create an appropriate electrical force. In further cases, the high-voltage source 302 may be connected to the rotating surface 308.

In yet other cases, any object may be suitably connected to the high voltage source 302 as long as the rotating surface 308 remains charged. The insulator plate 312 may be used to isolate the motor drive 314 from the high voltage objects (as described above). Without the insulator plate 312, there may be arcing between the motor drive 314 and the high voltage object In some cases, after deposition of the ligaments on the collection surface 310, the ligaments can undergo various types of post-processing to make a desired composite. Post-processing may include, for example, cross-linking, curing, or the like.

In the embodiment of a rotary disperser 400 shown in FIG. 4, the feeder 402 can be mechanically coupled to the rotating surface 406. In this case, both the feeder 402 and the rotating surface 406 are mutually rotatable. As well, in this case, the motor drive 404 is coupled to the feeder 402.

In the embodiments of FIG. 3 and FIG. 4, the rotating surface is in the shape of a rotating cone. However, any suitable geometry, shape, and arrangement may be used; for example, the rotating surface may be a curved surface such as a parabola, a flat surface such as a disk, or the like.

In further embodiments, as shown in the rotary disperser 500 of FIG. 5, there may be multiple concentric rotating surfaces 506, such as multiple rotating disks, with multiple surfaces for forming films 508. In this case, the feeder 502 feeds all the surfaces and is rotated by the motor drive 504. In another embodiment, the multiple concentric rotating surfaces 506 may be rotating while the feeder 502 may be stationary.

The composite mixture can be deposited at room temperature or elevated temperature. In addition, the rotating surface 308 and collection surface 310 can be operated at room temperature or elevated temperature. It is intended that operating at an elevated temperature may decrease the viscosity of polymer ligaments; or in the case of polymer melts, keeps the polymer in a melted state. In other cases, the composite mixture can be deposited, and/or the rotating surface 308 and collection surface 310 can be operated, at sub-ambient temperatures. Sub-ambient temperatures may allow predetermined regulation of the viscosity or amorphousness of the composite mixture. Polymers, for example some rubbers, may be amorphous below ambient temperature and cure a relatively moderate ambient temperatures.

Due to the centrifugal force acting on the freely movable film 306 imparted by the rotating surface 308, ligaments are formed on the rotating surface 308 and, in particular, at or near the edge 316 thereof; in this case, at the edge of the rotating cone shape. The composite mixture is subjected to shear flow deformation as it nears and propagates over the edge 316 of the rotating surface 308. Due to this deformation, the composite mixture breaks up from a film 306 into ligaments, which further disperses the fillers in the composite mixture. In particular, in this process, the ligaments are stretched a significant amount such that the ligaments exit the edge 316 as attenuated ligaments. Along with the centrifugal forces acting on the composite mixture due to the rotating surface 308, the composite mixture is also subject to viscous forces and surface-tension forces; which all impart shear and extensional deformation on the mixture.

Once the ligaments are spun or ejected from the edge 316 of the rotating surface 308, the ligaments are subject to the same or additional forces and further filler dispersion takes place via strong extensional and shear flow deformation to produce attenuated ligaments, as described above. The attenuated ligaments then reach the collection surface 310 where the composite material is deposited. The collection surface 310 can be configured to have any arrangement, shape or structure needed to ensure that substantially all of the material in the attenuated ligaments gets deposited on the collection surface 310.

It is intended that the collection surface 310 be configured to be at a distance and arrangement to substantially collect the ligaments after being ejected from the edge 316. However, where there is a voltage applied, the collection surface 310 should not be so close as to cause arcing between the rotating surface 308 and the collection surface 310.

Turning to FIG. 6, a dual-feed rotary disperser 600 is shown. Like the single-feed rotary disperser 300, the dual-feed rotary disperser 600 includes a rotating surface 308, a collection surface 310, an insulator plate 312, and a motor drive 314. In this embodiment, the dual-feed rotary disperser 600 includes a first feeder 602 and a second feeder 604. In further embodiments, there may be more than two feeders.

In one application of the dual-feeder arrangement, filler colloid and polymer solution, liquid or melt can be mixed concurrently with the dispersion caused by the rotating surface 308. Two distinct mixtures are deposited by each of the feeders 602, 604 on to the rotating surface 308. For example, a liquid polymer by the first feeder 602 and a liquid-filler colloid by the second feeder 604. In this case, prior mixing of the prepared liquid-filler colloid with the polymer, as described above, may not be required (i.e., see 204 in FIG. 2).

In a further application of the dual-feeder arrangement, the first and second feeders 602, 604 may be used to mix polymers. In this case, fillers may not be required or fillers can be introduced in the mixture by a further feeder. In a further application of a multi-feeder arrangement, the first and second feeders 602, 604 may be used to feed two different filler colloids and a third feeder can be introduced to feed the polymer solution, liquid, or melt. Similar to described herein, there can be multiple arrangements to feed polymer or any other viscoelastic material, filler, filler-colloids, and other additives on to the rotating surface 308.

Figure 7:
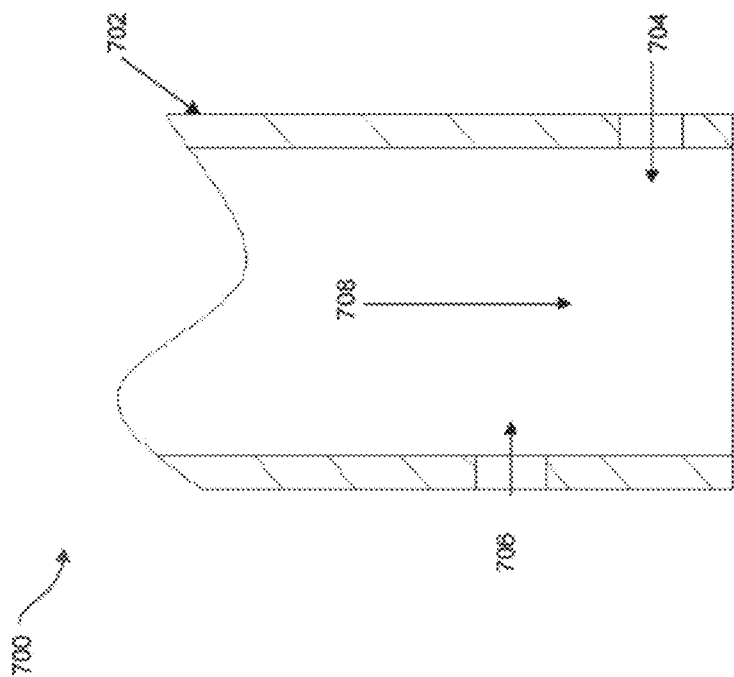
FIG. 7 is a diagram of an embodiment of a single tube feeder.

In further embodiments, for both single-feeder and multiple-feeder arrangements, the fillers and polymers may be mixed by combining streams of polymer and fillers in a feeder. FIG. 7 illustrates a feeder 700 with a single tube 702 that includes two side-port filler stream injections 704, 706. In other cases, there may be one or more side-port filler stream injections. The filler stream may be a filler, a filler-colloid mixture, or the like. The polymer 708 flows from the top of the tube 702.

Figure 8:
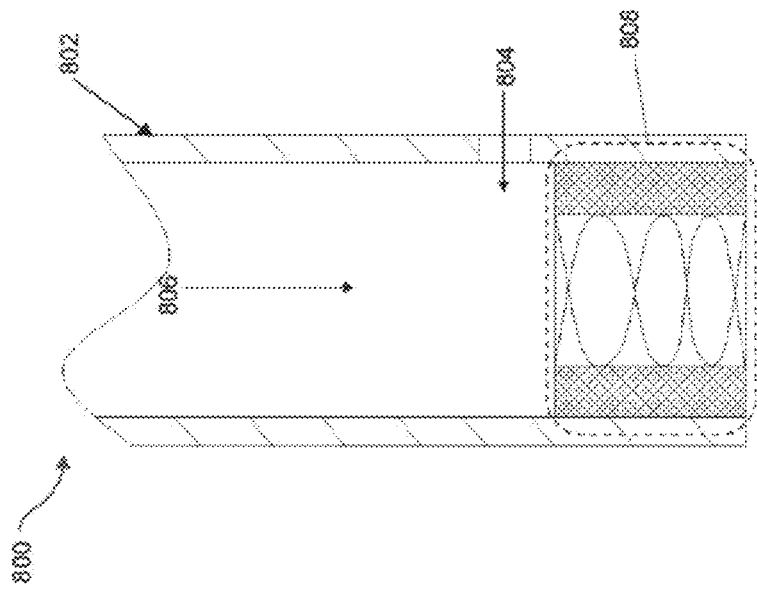
FIG. 8 is a diagram of an embodiment of a single tube feeder with a static mixer.

In some embodiments of a feeder, the premixed mixture may pass through a static mixer to further enhance mixing. An example of a static mixer feeder 800 is shown in FIG. 8. FIG. 8 illustrates a feeder 800 with single tube 802 that includes a side-port filler dosing stream injection 804. The polymer 806 flows from the top of the tube 802. Both the filler 804 and polymer 806 get actively mixed in the static mixer 808. The static mixer 808 may be, for example, a mechanical mixer or any other suitable mixer known in the art.

Figure 9:
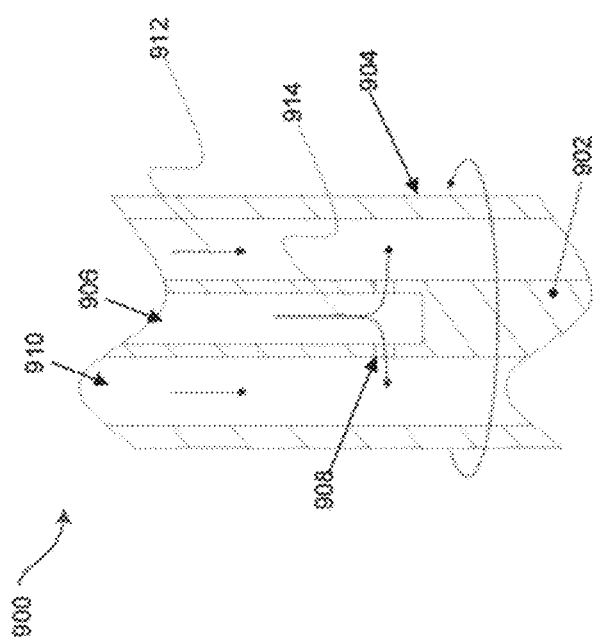
FIG. 9 is a diagram of an embodiment of a concentric tube feeder.

In a further embodiment, the filler and polymers may be mixed by combining streams of polymer and filler in the annulus of a concentric tube feeder, as shown in FIG. 9, FIG. 10, FIG. 11 and FIG. 12. In the example of FIG. 9, the concentric tube feeder 900 includes a non-rotating inner shaft 902 and a rotating outer shaft 904. A filler dosing stream 914 is provided to a cavity 906 in the inner shaft 902. Through one or more passageways 908, the filler stream 914 is provided to a mixing space 910 between the inner shaft 902 and the outer shaft 904 where the filler stream 914 is urged to mix with the polymer flow 912 due to the forces provided by the rotating outer shaft 904. Mixing via shear flow and extensional flow deformation is promoted upon integration of the plurality of flow streams in the annular region formed between said rotating and non-rotating surfaces of the outer and inner tubes, respectively. In further cases, the inner shaft 902 may be rotatable in a direction opposite that of the outer shaft 904.

Figure 10:
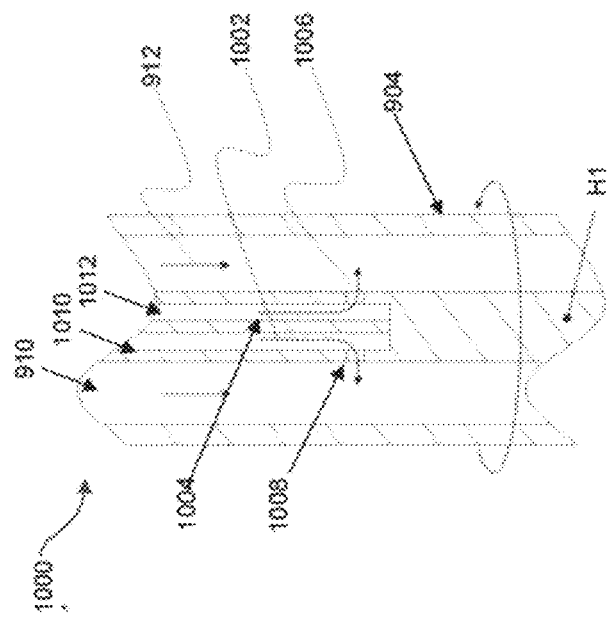
FIG. 10 is a diagram of an embodiment of a concentric tube feeder with an inner shaft with two cavities.

FIG. 10 shows another embodiment of a concentric tube feeder 1000. In this case, an inner shaft H1 has two or more cavities 1010, 1012. Each cavity may provide a separate filler dosing stream 1002, 1004. Each separate filler dosing stream 1002, 1004 may be of a similar or different filler material. Each filler dosing stream 1002, 1004 enters the space 910 between the inner shaft H1 and the outer shaft 904 through one or more separate passageways 1006, 1008. This configuration allows concurrent mixing of multiple different fillers or other component elements.

Figure 11:
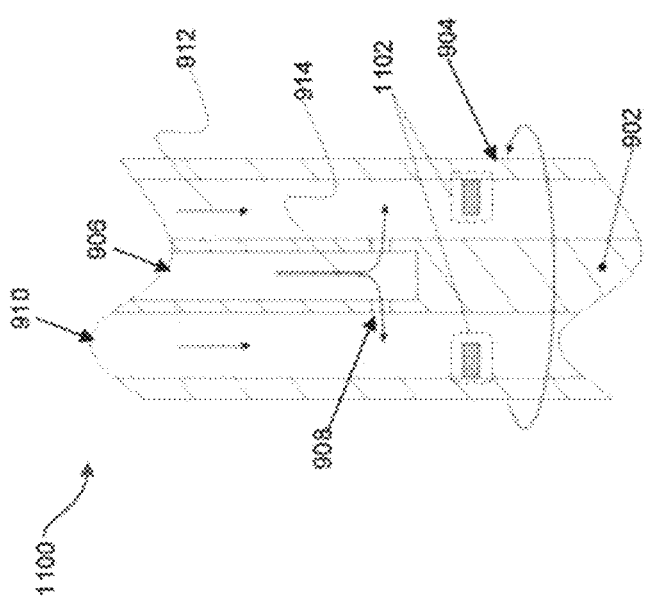
FIG. 11 is a diagram of an embodiment of a concentric tube feeder with geometric features.

FIG. 11 shows yet another embodiment of a concentric tube feeder 1100. In this case, the mixing space 910 includes geometric features 1102, which may be referred to as mixing elements, to impart turbulent flow energy and shear flow deformation into the integrated flow streams of filler 914 and polymer 912. In this example, the geometric features 1102 are fixed to the outer shaft 904; but in further examples the geometric features 1102 may be affixed to the inner shaft 902. In this example, the geometric features 1102 are rectangular; however, in other cases the geometric features 1102 may be, for example, triangular, successive fins, screw-shaped, or the like.

Figure 12:
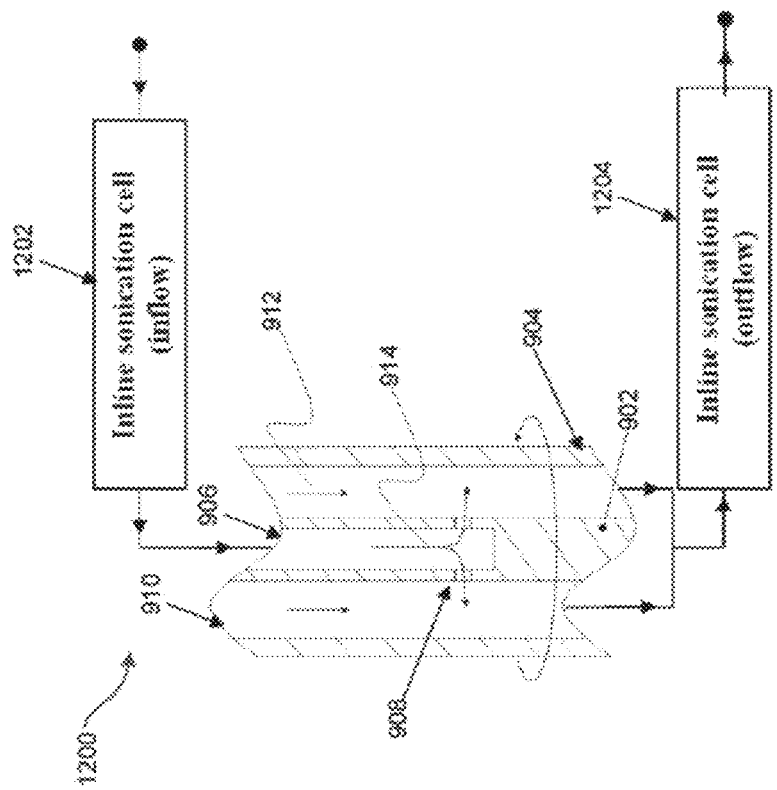
FIG. 12 is a diagram of an embodiment of a concentric tube feeder with inline sonication cells.

FIG. 12 shows yet another embodiment of a concentric tube feeder 1200. The concentric tube feeder 1200 includes an inflow inline sonication cell 1202 and an outflow inline sonication cell 1204. The inline sonication cells 1202, 1204 may be integrated with the filler dosing streams 914 in order to facilitate mixing of the integrated streams of filler 914 and polymer 912. Sonication cells may serve to further promote dispersive mixing of fillers in the respective colloids.

In any of the feeder arrangements, the flow stream inputs may generally be interchangeable. For instance, for the concentric tube feeder 900 of FIG. 9, the polymer stream and filler streams may pass through the inner cavity 906 and mixing space 910, respectively.

For each of the above feeder arrangements, fillers may be transported from a source location to the feeder by liquid fluidization, gravity feed, and/or any other known techniques. A liquid-fluidized dosing stream may consist of fillers with identical characteristic features or a plurality thereof. In addition, there may be a plurality of filler dosing streams with identical filler characteristic features or a plurality thereof. Moreover, the filler loading level and flow rate of each dosing stream may be the same or may be different. The carrier liquid in each liquid-fluidized dosing stream may also either be the same or be different. There may be a singular characteristic type of host polymer, for example chemical type, viscosity, molecular weight, or there may be a plurality thereof.

FIG. 13 illustrates a further embodiment of a rotary disperser 1300. The rotary disperser 1300 includes a static mixer 1302, or dispersion element, may be placed between two rotating surfaces 1304, 1306. The polymer and filler streams each enter through a separate feeder 1308, 1310. In other cases, each feeder 1308, 1310 may have any of the following: a polymer, a filler, a filler-colloid mixture, or any other component element.

The composite mixture passes through the dispersion element due the centrifugal force acting on the composite mixture before the mixture emerges from the rotating surfaces 1304, 1306 where it is then collected by a collection surface (not shown). In further cases, the arrangement and location of the static mixer 1302, or dispersion element, can differ from that shown in the embodiment in FIG. 13. In yet other cases, there may be multiple rotating surfaces 1304, 1306 with dispersion elements sandwiched between each adjacent pair of rotating surfaces 1304, 1306.

An example of an application of the rotary disperser described herein is for composite formation in insulator applications. Composites in insulator applications commonly use two types of fillers. Fumed silica ($SiO_2$) in nano-size may be used as reinforcement filler to lend physical strength to a polymer. Alumina trihydrate (ATH) in micro-size may be used to improve arc resistance. However, the use of nano-sized fumed silica in a silicone matrix typically limits the processing capability and final filler loading. This is due to the fumed silica, when compared to the other nano-sized fillers, significantly increasing the viscosity in the case of, for example, liquid silicone rubber (LSR) or room temperature vulcanize (RTV), or silicone rubber gums, for example high temperature vulcanize (HTV) or high consistency rubber (HCR).

Figure 14B:
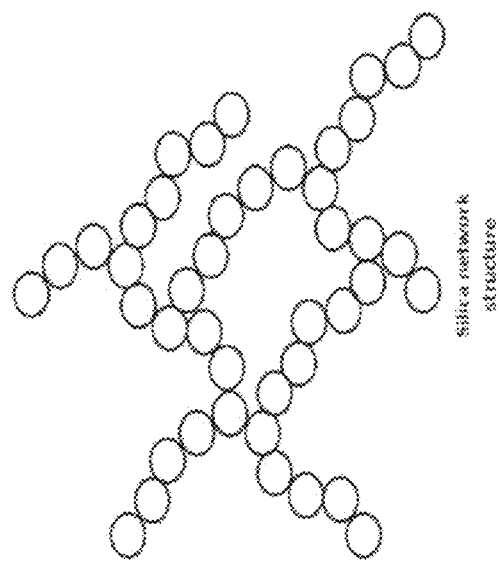
FIG. 14B is an example illustration of a three-dimensional network of silica filler particles.
Figure 14A:
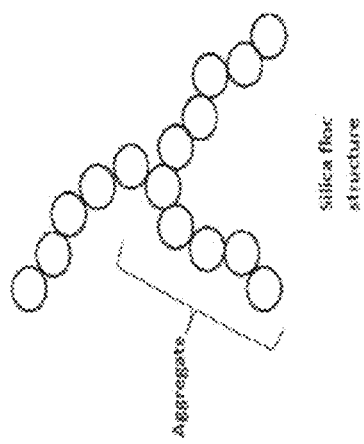
FIG. 14A is an example illustration of a silica floc structure.

Irrespective of filler type, it is conventionally inherently difficult to disperse fillers in a polymer matrix, especially as the filler size decreases to the micro and nano scales. This is primarily due to the particles tending to agglomerate because of their surface energy arising from Van Der Waals forces. As well, a silica particle-particle interaction mechanism exists that further increases the difficulty of dispersing this type of filler. There is a strong affinity between silica arising from hydrogen bonding, which results in a tendency for silica particles to aggregate in small chain-like structures. According to Raghavan & Khan (S. R. Raghavan, and S. A. Khan, "Shear-induced microstructural changes in flocculated suspensions of fumed silica," J. Rheology, Vol. 39, No. 6, pp. 1311-1325, 1995), at low to moderate filler loading levels, aggregates form interconnected structures referred to as flocs. An example of a silica floc structure is shown in FIG. 14A. Further, as shown in the example of FIG. 14B, at higher filler loading levels, these flocs join together to form three-dimensional networks of silica particles. The tendency for silica particles to form aggregates, flocs, and three dimensional networks with increasing filler loading levels creates a processing barrier which conventionally restricts the absolute maximum filler loading level that can practically be achieved. This limitation is primarily due to the viscosity limitations of the material. To overcome the challenge of increasing viscosity, high shear mixing and other conventional approaches are typically used to break up the network structures and flocs into aggregates. However, due to the strong particle-to-particle affinity, the flocs and networks are intrinsically restored after high shear is removed. Due to the processing challenges of working with micro-sized and nano-sized particles, namely the impact of increasing viscosity due to particle aggregation, conventional composite formation is limited.

It is intended that the properties of composite insulators can be significantly improved by employing embodiments of the rotary disperser 300, 600 and method described herein. The rotary disperser 300, 600 is intended to allow particle aggregations to be directly, locally, and efficiently broken down, thereby increasing the absolute filler loading level that can be incorporated into the composite insulator materials. Very high loading levels of fillers into polymer matrices may be used and the output may be a bulk composite. For example, in the case of fumed silica in liquid silicone rubber, the maximum filler loading level may be greater than 30 wt % in contrast to conventional techniques. In contrast to conventional techniques, the filler percentage in liquid silicone rubber will typically be a significantly lower value. This is due to higher loading levels typically increasing the viscosity For example, in the case of fumed silica in silicone rubber, the typical maximum filler loading level is approximately less than 10 wt %. As such, embodiments of the dispenser and method herein have been shown to able to provide loading levels above approximately 7 wt %, above approximately 10 wt %, above approximately 15 wt %, above approximately 30 wt %, and above approximately 50 wt %. It is believed that there may be no theoretical upper limit on loading level using the embodiments described herein.

Figure 15:
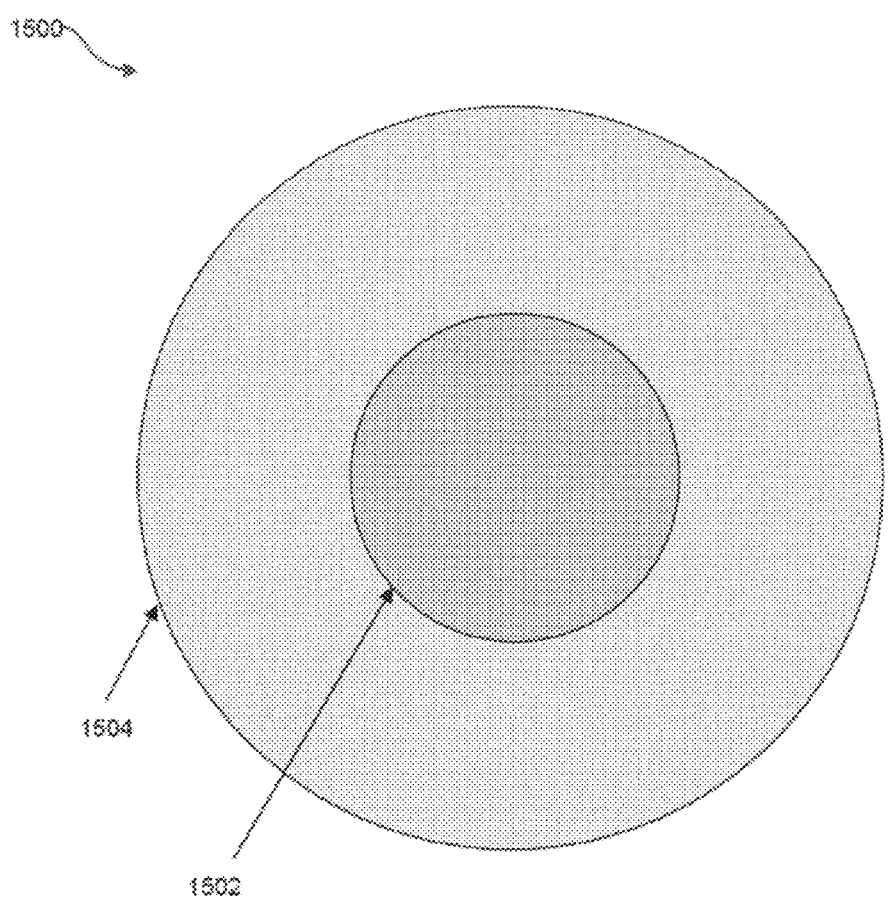
FIG. 15 is an example illustration of a polymer coated with fillers at high loading levels.

With the high filler loading levels available using the embodiments disclosed herein, the rotary disperser and method may be used for coating polymers or coating fillers. At high loading levels, the fillers may effectively become coatings on the polymer particles or vise versa. As shown in the example illustration 1500 of FIG. 15, at high loading levels, a polymer 1502 can be effectively coated by fillers 1504. At high loading levels in a liquid, melt, or any flowable polymer, the opposite may also be true whereby the polymer may form a coating 1504 and the core element 1502 may be a filler.

In the case of fumed silica in silicone rubber, the material may remain at a lower viscosity while having a high loading level in comparison to matching materials prepared using conventional mixing equipment. This property is contrary to conventional techniques which typically convert the composite mixture to be a solid or semi-solid. In some cases, the composite can retain approximately the same viscosity while having the higher loading level. This property may allow the composite to be used in various types of machinery.

Examples of applications for high loading level mixtures may include, for example, emulsions, paints, nanocomposites, tire rubber compounds, or the like.

Materials formed using the embodiments described herein may be able to possess higher electrical permittivity and thermal conductivity, and less viscosity, than for conventional materials with the same loading level. As well, the embodiments described herein permit keeping the viscosity relatively low for a given loading level.

The determinations and results presented below are intended to demonstrate the effect of embodiments of the dispersion system and method described above on aggregate physical properties; such physical properties will be examined since they are linked to the filler microstructure in a composite. For instance, with an increasing degree of filler dispersion, it is understood that agglomerated structures, for example large aggregated groups, flocs, or networks, may be broken down into small structures or even individual isolated filler particles in the polymer matrix. As a result, composites were prepared using two different mixing techniques: (1) with a conventional high shear mixing and (2) with multiple force mechanism dispersion as described herein. It is intended that the composites prepared with these two mixing techniques should exhibit different aggregate physical properties as a consequence of differences in the filler microstructure, which in turn, arises from the distinct differences in the degree of dispersion.

The following examples were conducted by the applicants to technically validate that: 1) the multi-force dispersion process (MFD) does not negatively alter the compound constituents, and 2) filler dispersion and final composite properties are improved over compounds prepared with conventional processing counterparts.

Example 1

Polymer compounds, namely, uncured/flowable composites, were prepared using room temperature vulcanized (RTV) silicone elastomer (RTV 615) and reinforcing fumed silica nano fillers (Aerosil 300VS) with MFD technology. Molecular weight (MW) measurements were carried out from Gel Permeation Chromatography (GPC) before (Sample 1) and after (Sample 2) MFD are shown in Table 1. Polymer MW measurements after MFD were made by removing fillers from the compound according to standard GPC techniques. As shown in Table 1, since the polymer mass average molecular weight (Mw), number average molecular weight (Mn) and Polydispersity index (PDI) are nearly unchanged before and after dispersion, the findings suggest that the polymer is not subjected to any process-related degradation, for example, chain scission or thermal degradation.

TABLE 1

MW and Polydispersity index (PDI) before and after MFD.

| Sample No. | Filler type | Filler weight percentage | Average molecular weights (Da) | | PDI (Mw/Mn) |
|---|---|---|---|---|---|
| | | | Mn | Mw | |
| Sample 1 | fumed silica | 0% | 8,232 | 40,190 | 4.882 |
| Sample 2 | | 15% | 8,364 | 41,636 | 4.978 |

Example 2

Polymer compounds with a highly aggregating filler, nano fumed silica (Aerosil 300VS), in RTV 615 were prepared with conventional high shear mixing (Ross HSM-100LSK) and MFD in order to examine differences in filler dispersability between the two technologies.

As shown in Table 2, a maximum loading level of 10 weight percent was reached with high shear (Sample 4), while the further inclusion of fillers was restricted due to the very high compound viscosity, likely due to the significant extent of filler aggregation. The addition of fillers transforms the compound into a gel-like high viscosity material and therefore, the viscosity was not measurable using a standard Malvern-Bohlin controlled stress/strain rheometer. Meanwhile, as shown in Table 2, loading levels above 10 weight percent were prepared with MFD (Samples 5 & 6) with a lower viscosity than that of the high shear mixed compounds at 10 weight percent. Since the lower reported viscosities with MED cannot be a consequence of process-induced degradation such as polymer chain-breaking (as evidenced by Example 1), the reported findings substantiate that the reduced viscosity and tolerance for higher loading levels of MFD are linked to filler dispersion and distribution occurring at microscopic levels, enhancing the filler-polymer interaction. In addition, scanning electron microscopy (SEM) images for composites with 10 weight percent fumed silica filler in RTV 615 are shown in FIG. 17 using the two mixing methods. These images further provide supporting evidence that the filler microstructure is severely aggregated for samples prepared with conventional high shear mixing than those prepared using MFD.

TABLE 2

Viscosity data of polymer compounds using different mixing methods.

| Sample No. | Filter type | Filler weight percentage | Viscosity at a shear rate of 1 s$^{-1}$ (mPa · s) | Mixing method |
|---|---|---|---|---|
| Sample 3 | Fumed silica | 0% | 3550 | — |
| Sample 4 | | 10% | >300,000 | Ross High Shear |
| Sample 5 | | 15% | 40,000 | MFD |
| Sample 6 | | 21% | 300,000 | MFD |

Example 3

As summarized in Table 3, polymer composites with a highly aggregating filler, nano fumed silica (Aerosil 300VS), in RTV 615 were prepared with conventional high shear mixing (Sample 8) and MFD (Samples 9-12) in order to examine the effect of filler dispersability and loading level on mechanical properties for both mixing technologies. The test samples were prepared by adding the RTV 615 curing agent (part B) to the primary mixture (fumed silica and RTV 615A) and then curing the samples at elevated temperature (175 deg. C.) and pressure (3300 psi). As described in Example 2, a maximum loading level of 10 weight percent (Sample 8) was reached with high shear, while the further increase of filler loading level was restricted due to the significant increase of compound viscosity. Meanwhile, dispersion of more than 25 weight percent fumed silica in RTV 615 was possible with MFD. As shown in Table 3, the hardness of the composite increases with the increase in filler loading level. Notably, the hardness increases from 55 (Shore A) to 80 (Shore A) by increasing the filler weight percent from 10 to 25, respectively, with MFD compared to high shear mixing. A decrease in tensile strength and elongation of the composites were observed with the addition of more crystalline ceramic fillers. However, a marked increase in tensile strength was observed with further increase in loading level of fillers (Sample 12) with MFD technology.

TABLE 3

Mechanical properties of polymer compounds using different mixing methods.

| Sample No. | Filler type | Filler weight percentage | Tensile Strength (PSI) | Elongation (%) | Hardness (Shore A) |
|---|---|---|---|---|---|
| Sample 7 | Fumed silica | 0% | 975 | 151 | 47 |
| Sample 8 | | 10% | 614 | 130 | 55 |
| Sample 9 | | 10% | 615 | 92 | 60 |
| Sample 10 | | 15% | 602 | 113 | 62 |
| Sample 11 | | 20% | 507 | 64 | 72 |
| Sample 12 | | 25% | 926 | 101 | 80 |

Example 4

In accordance with materials used for high voltage insulators, composite samples in Table 4 were prepared using different concentrations of micro and nano silica and ATH fillers in a polymer matrix of liquid silicone rubber (RTV 615). The samples were cured by adding the curing agent (RTV 615 B) and elevating the temperature (175 deg. C.) and pressure (3300 psi). The temporal change in temperature at a fixed location on the surface of a cured composite sample was measured (measurement location) for samples with silica filler (silica composites) and samples with ATH filler (ATH composites). Temperature profiles were used to indirectly examine differences in thermal conductivity behaviour between the composite samples. A constant incident heat flux on the composite surface was generated by subjecting each sample to a laser beam (4000 mW) focused on the composite surface oppose to that of the measurement location (i.e., on the back surface of the sample). The sample and laser separation distance was 70 mm. A thermal imaging camera was used to measure the surface temperature at the measurement location. In addition, the thermal erosion of the composite was quantified by measuring the weight of eroded mass due to the laser heating by subjecting the samples to a 9400 mW laser for a duration of 10 minutes.

As shown in Table 4, three different samples were prepared for each composite type, for example silica and ATH, to compare the composite properties: 1) at matching loading levels prepared using conventional high shear mixing and MFD, and 2) at high loading levels only achievable with MFD against maximum loading with conventional high shear mixing.

Figure 16A:
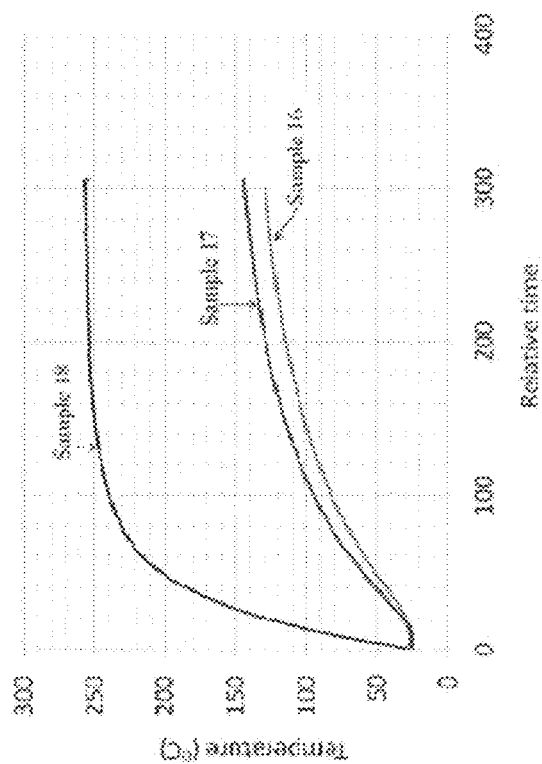
FIG. 16A is a graph of a temperature profile for silica composites.
Figure 16B:
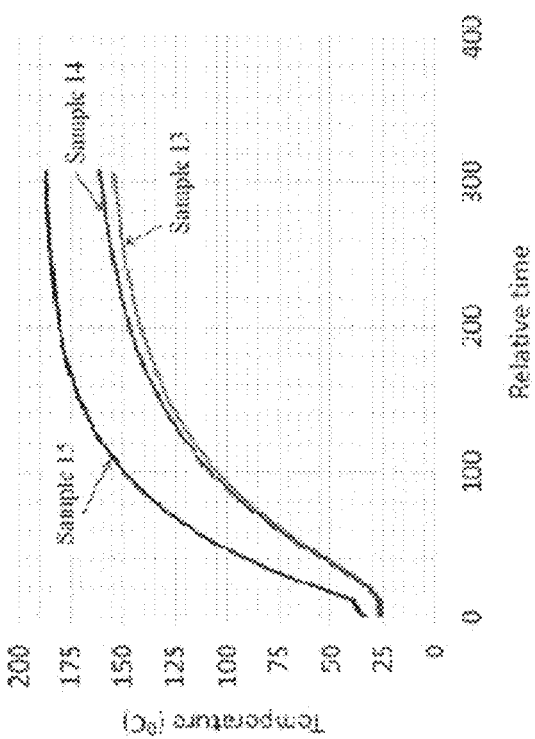
FIG. 16B is a graph of a temperature profile for ATH composites.

Temperature profiles of silica composites and ATH composites are shown in FIG. 16A and FIG. 16B, respectively. For a given sample, it was found that the surface temperature increases with time upon exposure to the incident heat flux source and eventually reaches an equilibrium temperature. Due to the filler-to-filler proximity, heat is conducted away from the incident heat flux source, distributing the heat throughout the composite material. Eventually, the filler particles and surrounding polymer reach steady-state equilibrium temperature. For the silica composite samples with matching filler loading levels (FIG. 16A), the sample surface temperature prepared with the MFD technique (Sample 14) attained a higher equilibrium surface temperature than the sample prepared using high shear mixing (Sample 13). The equilibrium temperature of the sample prepared with MFD and high shear mixing reached 161 deg. C. and 154 deg. C., respectively. An identical trend was observed with ATH composite samples with matching loading levels (FIG. 16B), where the MFD and high shear mixed samples attained equilibrium temperatures of 144 deg. C. and 129 deg. C., respectively. For samples prepared at higher filler loading levels using MFD, both silica and ATH composite samples show significantly higher surface temperatures of 187 deg. C. and 254 deg. C. for silica (Sample 15) and ATH/silica (Sample 18) composite samples, respectively.

TABLE 4

Filler constituents of polymer compounds used for measurement of thermal properties.

| | Filler type | | Filler weight percentage | | |
|---|---|---|---|---|---|
| Sample No. | nano | micro | nano | micro | Mixing method |
| Sample 13 | fumed silica | silica | 12% | 28% | Ross high shear |
| Sample 14 | fumed silica | silica | 12% | 28% | MFD |
| Sample 15* | fumed silica | silica | 10% | 50% | MFD |
| Sample 16 | nano ATH | ATH | 12% | 38% | Ross high shear |
| Sample 17 | nano ATH | ATH | 12% | 38% | MFD |
| Sample 18* | fumed silica | ATH | 10% | 60% | MFD |

*Matching filler weight percentages could not be prepared with conventional high shear mixing due to processing limitations.

Figure 18:
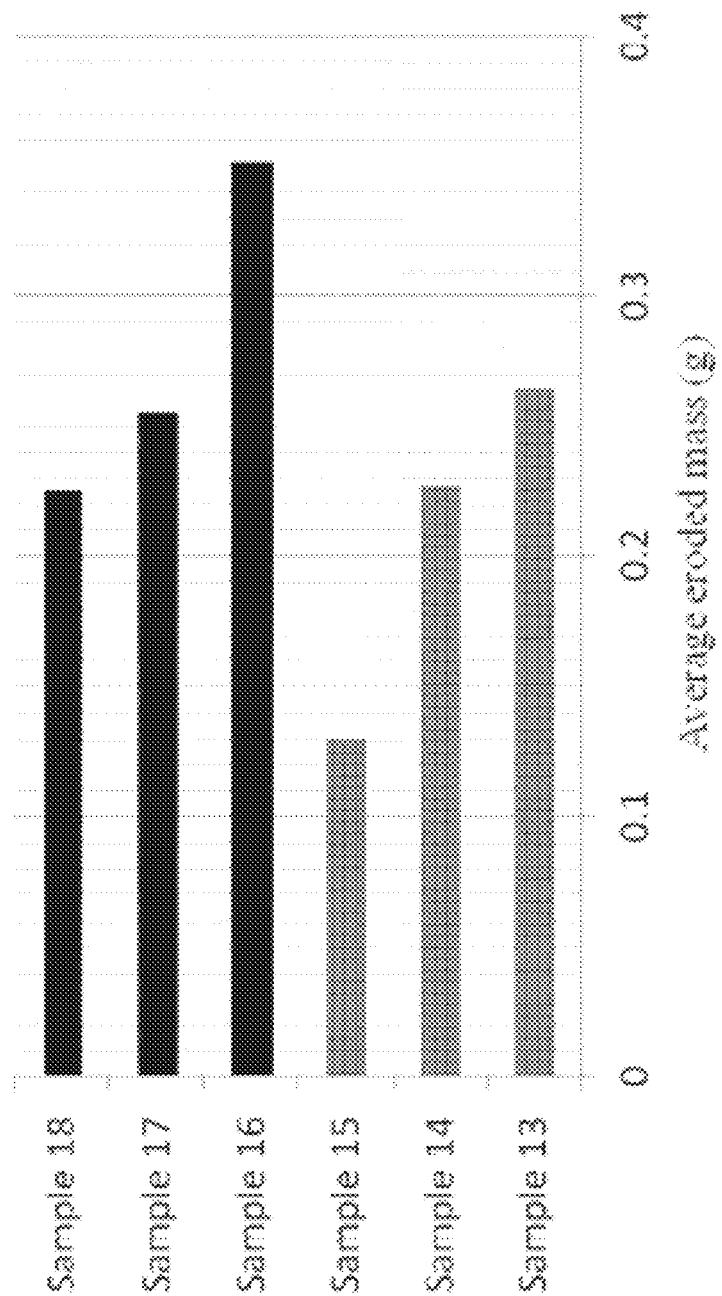
FIG. 18 is a graph of average eroded mass of both silica and ATH composites.

Differences in thermal behaviour for the two mixing methods can be understood by examining the filler microstructure as depicted in FIG. 17A and FIG. 17B. FIG. 17A and FIG. 17B show scanning electron microscopy (SEM)

images of fumed silica composites for 10 wt % fumed silica (Aerosil 300VS) using two mixing methods. FIG. 17A shows conventional mixing methods and FIG. 17B shows multiple force mixing as described herein. As shown in FIG. 17A, for both silica and ATH composite samples, it is difficult to disperse micro and nano fillers using conventional technologies, such as high shear mixing. This is believed to be due to the increase of viscosity in the composite due to filler agglomeration. As observed in FIG. 17, the degree of filler dispersibility and distribution, namely dispersion quality, is superior for compounds mixed with MFD since the method is capable of breaking up large aggregate filler networks and flocs in the composite. In addition, as shown in Table 4, the breaking up of large aggregate filler networks and flocs helps to increase the filler loading levels significantly with MFD technology. Similarly, as shown in the graph of FIG. 18, the resistance to thermal erosion of both silica and ATH composites has been improved significantly with the increase of filler loading level and distribution. Therefore, as shown in FIG. 16A, FIG. 16B and FIG. 18, the greater filler distribution and higher filler loading levels with MFD may enhance thermal properties such as heat transfer and resistance to thermal erosion compared to conventional mixing technologies.

Example 5

Polymer compounds were prepared with nano and micro titanium dioxide ($TiO_2$) to demonstrate the effect of dispersibility and loading level on the dielectric properties of polymer composites. Polymer composites (RTV 615) were prepared using micro and nano fillers with conventional high shear mixing and MFD as reported in Table 5. Higher loading level compositions were only achievable with MFD technology as the loading level of composites prepared with high shear mixing were restricted due to the significant increase in compound viscosity. After mixing, the test samples, as shown in Table 5, were cured at elevated temperature (175 deg. C.) and pressure (3300 psi).

Figure 19:
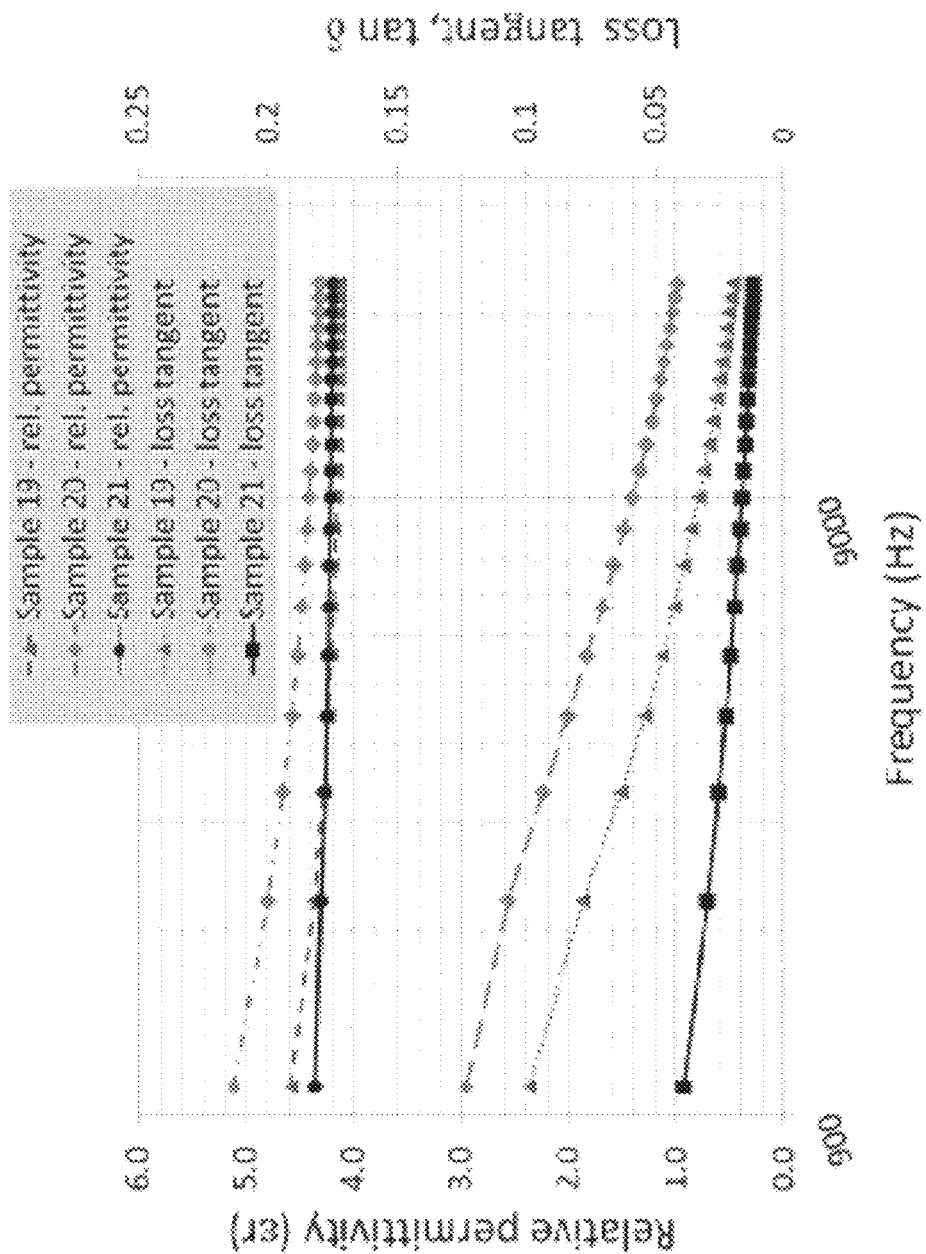
FIG. 19 is a graph of the variation in relative permittivity and the loss tangent with increasing frequency for $TiO_2$ ($\varepsilon_r=100$) nano/micro composites at lower concentrations (≤40 wt %)

FIG. 19 shows a graph of the variation in relative permittivity and the loss tangent with increasing frequency for $TiO_2$ ($\in_r=100$) nano/micro composites at low concentrations (≤40 wt %). As shown in FIG. 19, the relative permittivity is slightly higher at low frequencies and becomes more stable at higher frequencies. A notable increase in the relative permittivity is observed in comparison to the relative permittivity of base polymer (silicone rubber, $\in_r=2.7$) regardless of the mixing method. Generally, for composites prepared using conventional high shear mixing (Sample 20), a marginally higher relative permittivity was found compared to composites formed using MFD (Sample 21) at lower loading levels (≤40 wt %).

Comparing samples prepared using conventional mixing for 30 wt % micro fillers (Sample 19) and 30 wt % micro and 10 wt % nano fillers (Sample 20) shown in FIG. 19, it was found that the effect of nano fillers on improving the relative permittivity is not significant at lower loading levels. However, the addition of nano fillers has a markedly adverse effect on the loss tangent, evidenced by the higher magnitude in the loss tangent for Samples 19 and 20. It is believed that the adverse effect of nano fillers on the loss tangent are significantly reduced with the improved dispersion of the fillers in the polymer matrix using MFD (Sample 21), evidenced by a markedly lower value in the loss tangent shown in FIG. 19. It is further believed that the response of the relative permittivity and loss tangent behaviour to filler dispersibility implies that filler agglomerations may improve bulk properties such as relative permittivity, but adversely affect properties reliant on filler networking such as loss tangent. In other words, properties like relative permittivity, which relate to the electrical energy stored in a material by an applied voltage, is more strongly attributed to the respective inherent properties of filler materials rather than the percolation or network structure of the fillers in the composite. Conversely, it is believed that properties such as loss tangent, which relates to the charge conduction through the material, is governed by both material characteristics and the filler network structure such as percolation.

Figure 20B:
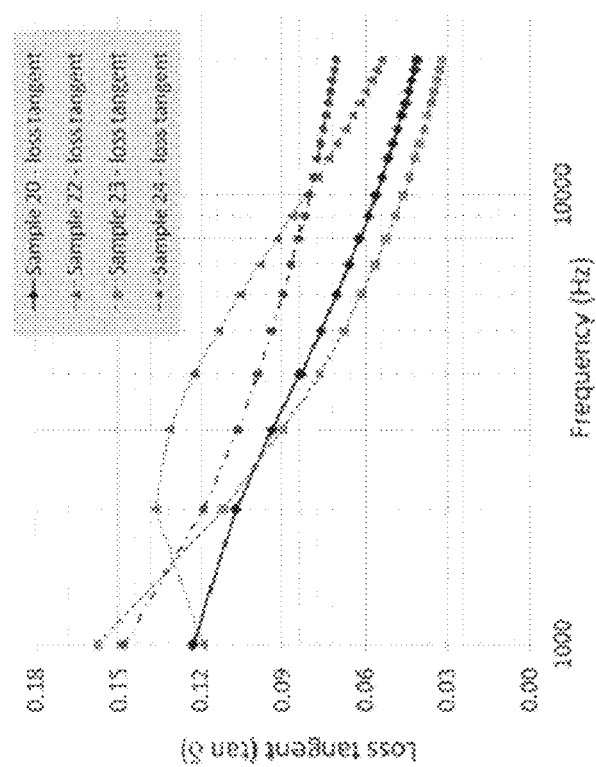
FIG. 20B is a graph of the loss tangent of composite samples at higher concentrations (≥40 wt %).
Figure 20A:
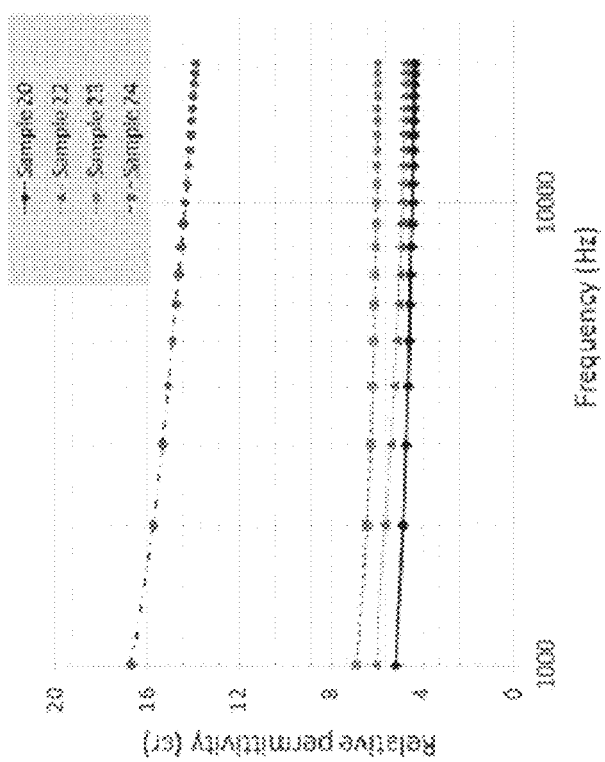
FIG. 20A is a graph of the relative permittivity of composite samples at higher concentrations (≥40 wt %)

As shown in the graph of FIG. 20A, the relative permittivity of the composite may be significantly enhanced by increasing the filler loading level to approach the percolation limit. In this case, composites with 50 wt % micro $TiO_2$ and 10 wt % nano $TiO_2$ particles (Sample 23) and composites with 65 wt % micro $TiO_2$ and 10 wt % nano $TiO_2$ particles (Sample 24) prepared using MFD show a significantly higher relative permittivity compared to composites with 50 wt % micro $TiO_2$ particles (Sample 22) prepared using conventional high shear mixing. It must be noted here that it is extremely difficult to mix a compound with greater than 60 wt % filler ($TiO_2$) loading levels using conventional high shear mixing. In addition, as shown in the graph of FIG. 20B, the higher loading level composites prepared using MFD still show an improved loss tangent compared to the composites made of 30 wt % micro $TiO_2$ and 10 wt % nano $TiO_2$ particles (Sample 20) using conventional high shear mixing at higher frequencies.

TABLE 5

Filler constituents of polymer compounds used for measurement of dielectric properties.

| | Filler type | | Filer weight percentage | | |
|---|---|---|---|---|---|
| Sample No. | nano | micro | nano | micro | Mixing method |
| Sample 19 | $TiO_2$ | $TiO_2$ | — | 30% | Ross high shear |
| Sample 20 | | | 10% | 30% | Ross high shear |
| Sample 21 | | | 10% | 30% | MFD |
| Sample 22 | | | — | 50% | Ross high shear |
| Sample 23* | | | 10% | 50% | MFD |
| Sample 24* | | | 10% | 65% | MFD |

*Matching filler weight percentages could not be prepared with conventional high shear mixing due to processing limitations.

It is intended that silicone composite based insulators generally have better hydrophobicity and lower surface energy than most organic/inorganic materials based insulators. The surface properties of silicone are unique, in that it recovers its hydrophobicity between contamination and/or corona episodes, while other materials progressively deteriorate. However, the polymer-filler combination is important in silicone based insulators. Processing and performances, including physical, electrical, and thermal, are all affected by the properties of the polymer. These properties may include, for example, molecular weight and structure, as well as properties of fillers, such as filler type, size, shape, surface treatment, and residual catalyst or contaminants. In determining the optimum formulation for specific applications, device manufacturers and material suppliers generally determine the best balance of properties, processing characteristics, and economic considerations.

Conventionally, reinforcing fillers are hard to mix into a silicone based polymer with any dispersion method. Silicone is hydrophobic while fillers are typically hydrophilic. This hydrophilic property may be good for reinforcing the material but it becomes difficult to add to the hydrophobic silicone. It was determined by the applicants that by adding the hydrophobic material to the mixture first followed by the hydrophilic material, the dispersion and the loading level of the hydrophilic material can be increased when compared with conventional approaches. As well, by adding the hydrophobic material to the mixture first, the size of particles may be controlled.

In the embodiments described herein, it is intended that a mechanical force such as centrifugal force may be used to form ligaments with diameters in the approximate range of several microns. The ligaments are then subject to additional or further forces to attenuate the ligaments to cause further dispersion of the filler in the polymer matrix. Compatible solvents and/or additives may serve as functional additives to promote filler dispersion via electric forces, for example, ligament whipping and filler repulsion. Using embodiments of the system and method herein, dispersion can occur without the need for precise handling of the composite mixture and allow for larger scale formation of composite materials with real-time dispersion occurring by ligament formation and attenuation of the ligaments.

It is intended that a large population of ligaments may be generated from the film 306 on the rotating surface 308. The applicants have determined that a rotating cone surface can generate multiple ligaments simultaneously, for example, up to 600 depending on the composite mixture viscosity, rotational speed, and feed rate. Hence, the production rate may be enhanced significantly relative to the dispersion approach using conventional techniques.

It is also intended that the embodiments described herein may provide greater versatility in filler selection. Both micro and nano fillers can be incorporated into a polymer matrix using this described approach. In further embodiments, other nano and/or micro structures, such as nanotubes, nanofibers, nano flakes, or the like, may likewise be dispersed into a polymer matrix.

It is also intended that the embodiments described herein will provide greater versatility in polymer selection, including the use of with polymer melts.

It is also intended that the embodiments described herein provide a greater range of mixture viscosities. The film flow generated from the composite mixture while on the rotating surface 308 due to centrifugal force serves to initiate ligaments for a wide range of polymer viscosities, particularly high viscosities, which suffer from poor flowability and deformation. Thus, it is intended that an inherent limitation in dispersions prepared using conventional mechanical mixing technologies and various other conventional approaches can be overcome.

It is also intended that, in the embodiments described herein, the combination of multiple force mechanisms simultaneously applied to ligaments are able to breakup filler agglomerations. As stated, conventional dispersion technologies generally apply stress arising from mechanical shear flow deformation to break up filler agglomerations. These techniques face barriers in achieving high loading levels and adequate dispersion, largely due to the inefficiency in generating a polymer-filler interfacial surface necessary to break up filler agglomerations. As well, dispersions prepared using conventional techniques suffer from low production rates and poor filler loading levels. In the embodiments described herein, electric forces applied to ligaments may be an effective technique to leverage stresses arising from shear and extensional flow deformation to disperse fillers in a polymer matrix. Further, the force mechanisms, from mechanical and electric forces, may be combined. Ligaments in the presence of mechanical and electrical forces are subjected to strong shear and extensional deformation arising from stretching, thinning, and whipping. As well, fillers are directly subjected to charge repulsion. This combination of forces and physical ligament whipping behaviour have been found to improve filler dispersion and loading levels in compounds compared to conventional dispersion approaches. These findings indicate that extensional flow deformation can be strongly exploited by combining mechanical forces, namely a centrifugal force, with electrical forces on ligaments to enhance filler dispersion and loading.

It is also intended that the embodiments described herein may use liquid polymer (thermosets) or melts (thermoplastics). The embodiments may incorporate fillers into the polymer using a liquid carrier, which can be a solvent, liquid, or using direct injection during the process. In that way, fillers may be pre-dispersed in a liquid carrier rather than a polymer matrix.

In an aspect of the embodiments described herein, a method for forming a composite material is provided that includes: combining and pre-mixing at least one 1st and at least one 2nd component elements to form a composite mixture; dispersing the 2nd component element in the 1st component element using a first force in order to form ligaments, wherein the first force is mechanical; further dispersing the 2nd component element in the 1st component element using one or more second forces in order to form attenuated ligaments; and collecting the attenuated ligaments.

In a particular case, the mechanical first force may be, for example, centrifugal force, high pressure force, or the like. The mechanical first force may be provided by, for example, squeezing the composite mixture under the application of pressure through a die plate with at least one orifice; using a melt blower; using a sprayer machine; using an atomization device, for example, a rotating surface device, or the like.

Further, the one or more second forces may include centrifugal, pressure, aerodynamic, electrical, electrostatic, electrophoretic, dielectrophoretic, magnetic, Coulomb, or the like, or a combination thereof. The first and second forces may be similar or different.

In a particular case, the 1st component element may be a viscoelastic material or may be a material that exhibits viscoelastic behaviour, for example, when mixed with the 2nd component elements. The 1st component element may be selected from: polymer melt; polymer solution; liquid polymer; flowable polymer, or a combination thereof.

The 2nd component element (sometimes referred to as filler) may have one or more of the following properties:
  size may be micro and/or nano
  shape may be particles (3 dimensions in nano/micro scale), fibres or tubes (2 dimensions in nano/micro scale), and plates or flakes (one dimension in nano/micro scale)
  physical state may be solid, liquid, gas,
  may be a polymer
  surface chemistry may be hydrophilic or hydrophobic
  surface chemistry may be chemically compatible/incompatible with $1^{st}$ component element with a chemical method such as surfactant, dispersant aid, coupling agent, or the like, to improve dispersion of the $2^{nd}$ component element in $1^{st}$ component element and/or a compliant liquid
  may be induced during mixing (e.g., emulsion)
  or a combination thereof In some cases, prior to mixing the 2nd component element with the 1st component element, the 2nd component element may be made into a filler colloid or the like by, for example, combining the 2nd component element with a compliant liquid. The compliant liquid may be, for example, miscible/immiscible in the 1st component element, a solvent, or the like.

In another case, the 1st component element and 2nd component element may be pre-mixed prior to application of the first force or the one or more second forces.

In some cases, there may be a plurality of 1st component elements and/or a plurality of 2nd component elements. It will further be understood that the 1st component element and 2nd component element may include objects having a plurality of sizes, dimensions, or physical states. Further, each 2nd component element may not be mixed with the 1st component objects at the same time, for example, one 2nd component element (e.g., a hydrophobic filler) may be added prior to a subsequent 2nd component element (e.g., a hydrophilic filler), and the like In some particular cases, the method or portions thereof may be performed at predetermined temperatures.

In another aspect of the embodiments herein, a system for forming a composite material is provided that includes: a feeder for combining and pre-mixing at least one 1st component element and at least one 2nd component element to form a composite mixture; a first disperser for dispersing the 1st component element in the 2nd component element using a mechanical first force in order to form ligaments; a second disperser for further dispersing the 1st component element in the 2nd component element using one or more second forces in order to form attenuated ligaments; and a collector for collecting the attenuated ligaments.

In a particular case, the feeder may be one or more feeder modules that feed the component elements and may include pre-mixers for pre-mixing the component elements.

Further, the first disperser and second disperser may be a rotating surface configured to receive the first component element and the second component element from the feeder, the rotating surface configured to impart a centrifugal force to the first component element and the second component element to both mix the component elements using both shear and extensional deformation to form the ligaments and force a predetermined portion of the composite to the edge of and off the rotating surface in order to form the attenuated ligaments.

In a particular case, the feeder, first disperser, second disperser and collector may be at predetermined temperatures.

In some cases, the second disperser may include an electric field applied between the feeder or rotating surface and the collector in order to provide an additional second force.

In some of the above cases, the rotary surface may be a flat disk; a cone; a parabolic surface; a plurality of rotating surfaces; a rotating surface with grooves to guide the formation of ligaments, or the like.

Composite materials created using the method or system described herein are intended to have properties that are different from conventional composite materials. For example, composite materials may have a loading level of the 2nd component element in the composite of between 0.001 wt % and 100 wt %. In particular, the loading level may be greater than 7 wt %, greater than 10 wt %, greater than 20 wt %, greater than 30 wt %, greater than 40 wt %, greater than 50 wt %, greater than 60 wt %, greater than 70 wt %, greater than 80 wt %, greater than 85 wt % or an appropriate wt % in or above these ranges.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments described herein or elements thereof are implemented as a software routine, hardware circuit, firmware, or a combination thereof.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for forming a liquid composite material, the method comprising:
    combining a first component element with a second component element to form a liquid composite mixture;
    inserting the liquid composite mixture into a feeder configured to deposit the liquid composite mixture onto a rotating surface;
    charging the liquid composite mixture prior to the liquid composite mixture being deposited onto the rotating surface;
    subjecting the liquid composite mixture to a first force on the rotating surface to form liquid ligaments and disperse the first component element and second component element in relation to each other, wherein the first force is a mechanical force;
    subjecting the liquid ligaments to at least one second force to form attenuated liquid ligaments and further disperse the first component element and second component element in relation to each other within the attenuated liquid ligaments, wherein the at least one second force comprises centrifugal force and electrostatic force and the at least one second force imparts both shear flow deformation and extensional flow deformation to the liquid ligaments to form the attenuated liquid ligaments; and
    collecting the attenuated liquid ligaments on a collection surface, the attenuated liquid ligaments coalescing on the collection surface to form a well-dispersed, heterogeneous bulk material as the liquid composite material.

2. The method of claim 1, wherein the at least one second force is a continuation of the first force.

3. The method of claim 1, wherein the first component element is viscoelastic material and the second component element is a filler.

4. The method of claim 3, wherein the viscoelastic material is a polymer.

5. The method of claim 1, wherein the first force comprises centrifugal force and the at least one second force comprises centrifugal force and electrostatic force.

6. The method of claim 1, wherein, on the rotating surface, the liquid composite mixture forms a film.

7. The method of claim 1, wherein charging the liquid composite mixture prior to the liquid composite mixture being deposited onto the rotating surface includes charging the liquid composite mixture in the feeder.

8. The method of claim 7, wherein charging the liquid composite mixture in the feeder is by connecting the feeder to a voltage source.

9. The method of claim 1, wherein inserting the liquid composite mixture into the feeder includes passing the liquid composite mixture through a static mixer of the feeder to enhance mixing of the first component element and the second component element.

* * * * *